(12) United States Patent
Kobino et al.

(10) Patent No.: US 8,592,085 B2
(45) Date of Patent: Nov. 26, 2013

(54) NICKEL-COBALT-MAGANESE-BASED COMPOUND PARTICLES AND PROCESS FOR PRODUCING THE NICKEL-COBALT-MANGANESE-BASED COMPOUND PARTICLES, LITHIUM COMPOSITE OXIDE PARTICLES AND PROCESS FOR PRODUCING THE LITHIUM COMPOSITE OXIDE PARTICLES, AND NON-AQUEOUS ELECTROLYTE SECONDARY BATTERY

(75) Inventors: Masashi Kobino, Yamaguchi-ken (JP); Katsuhiro Fujita, Yamaguchi-ken (JP); Shoichi Fujino, Yamaguchi-ken (JP); Akihisa Kajiyama, Yamaguchi-ken (JP); Ryuta Masaki, Yamaguchi-ken (JP); Daisuke Morita, Yamaguchi-ken (JP); Takayuki Yamamura, Yamaguchi-ken (JP); Tetsuya Kodaira, Yamaguchi-ken (JP); Minoru Yamasaki, Yamaguchi-ken (JP); Seiji Okazaki, Hiroshima-ken (JP); Toshiaki Hiramoto, Hiroshima-ken (JP); Akino Sato, Hiroshima-ken (JP); Wataru Oda, Hiroshima-ken (JP); Kenji Okinaka, Yamaguchi-ken (JP)

(73) Assignee: Toda Kogyo Corporation, Otaki-Shi, Hiroshima-Ken (JP)

( * ) Notice: Subject to any disclaimer, the term of this patent is extended or adjusted under 35 U.S.C. 154(b) by 0 days.

(21) Appl. No.: 13/503,155

(22) PCT Filed: Oct. 21, 2010

(86) PCT No.: PCT/JP2010/068640
§ 371 (c)(1),
(2), (4) Date: Jun. 27, 2012

(87) PCT Pub. No.: WO2011/049185
PCT Pub. Date: Apr. 28, 2011

(65) Prior Publication Data
US 2013/0045421 A1 Feb. 21, 2013

(30) Foreign Application Priority Data

Oct. 22, 2009 (JP) ................................ 2009-243923

(51) Int. Cl.
*H01M 4/13* (2010.01)
(52) U.S. Cl.
USPC ...................... 429/223; 429/224; 429/231.95
(58) Field of Classification Search
None
See application file for complete search history.

(56) References Cited

U.S. PATENT DOCUMENTS

| 6,045,771 | A | 4/2000 | Matsubara et al. |
| 7,217,475 | B2 * | 5/2007 | Nakanishi et al. ....... 429/231.95 |
| 2002/0053663 | A1 | 5/2002 | Ito et al. |
| 2003/0170540 | A1 | 9/2003 | Ohzuku et al. |
| 2005/0089756 | A1 | 4/2005 | Ito et al. |
| 2006/0081818 | A1 | 4/2006 | Ito et al. |
| 2006/0083989 | A1 | 4/2006 | Suhara et al. |
| 2007/0292763 | A1 * | 12/2007 | Park et al. ................. 429/231.1 |
| 2008/0096111 | A1 | 4/2008 | Ohzuku et al. |
| 2008/0193844 | A1 | 8/2008 | Ohzuku et al. |
| 2008/0241053 | A1 | 10/2008 | Suhara et al. |
| 2008/0248391 | A1 * | 10/2008 | Wakasugi et al. ............. 429/223 |
| 2009/0258296 | A1 * | 10/2009 | Kawasato et al. ............. 429/223 |
| 2009/0302267 | A1 | 12/2009 | Albrecht et al. |
| 2009/0314985 | A1 | 12/2009 | Malcus et al. |

FOREIGN PATENT DOCUMENTS

| JP | 2003-051311 | 2/2003 |
| JP | 2008-013405 | 1/2008 |
| JP | 2008-147068 | 6/2008 |

OTHER PUBLICATIONS

Lee et al., Synthetic optimization of Li[Ni1/3Co1/3Mn1/3]O2 via co-precipitation, Electrochimica Acta 50 (2004) 939-948 Available online Sep. 11, 2004.*

Nukuda et al., Development of a lithium ion battery using new cathode material, Journal of Power Sources, 146 (2005) 611-616, Available online Jul. 5, 2005.*

International Search Report for PCT/JP2010/68640, mailed Nov. 30, 2010.

* cited by examiner

*Primary Examiner* — Patrick Ryan
*Assistant Examiner* — Jose Colucci Rios
(74) *Attorney, Agent, or Firm* — Nixon & Vanderhye PC

(57) ABSTRACT

The present invention relates to nickel-cobalt-manganese-based compound particles which have a volume-based average secondary particle diameter (D50) of 3.0 to 25.0 μm, wherein the volume-based average secondary particle diameter (D50) and a half value width (W) of the peak in volume-based particle size distribution of secondary particles thereof satisfy the relational formula: $W \leq 0.4 \times D50$, and can be produced by dropping a metal salt-containing solution and an alkali solution to an alkali solution at the same time, followed by subjecting the obtained reaction solution to neutralization and precipitation reaction. The nickel-cobalt-manganese-based compound particles according to the present invention have a uniform particle size, a less content of very fine particles, a high crystallinity and a large primary particle diameter, and therefore are useful as a precursor of a positive electrode active substance used in a non-aqueous electrolyte secondary battery.

8 Claims, 25 Drawing Sheets

NICKEL-COBALT-MAGANESE-BASED COMPOUND PARTICLES AND PROCESS FOR PRODUCING THE NICKEL-COBALT-MANGANESE-BASED COMPOUND PARTICLES, LITHIUM COMPOSITE OXIDE PARTICLES AND PROCESS FOR PRODUCING THE LITHIUM COMPOSITE OXIDE PARTICLES, AND NON-AQUEOUS ELECTROLYTE SECONDARY BATTERY

This application is the U.S. national phase of International Application No. PCT/JP2010/68640 filed 21 Oct. 2010 which designated the U.S. and claims priority to JP Patent Application No. 2008-243923 filed 22 Oct. 2009, the entire contents of each of which are hereby incorporated by reference.

TECHNICAL FIELD

The present invention relates to nickel-cobalt-manganese-based compound particles having a uniform particle size, a less content of very fine particles, a high crystallinity and a large primary particle diameter. The nickel-cobalt-manganese-based compound particles according to the present invention are useful as a precursor of a positive electrode (cathode) active substance used in a non-aqueous electrolyte secondary battery.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Under these circumstances, the lithium ion secondary batteries having advantages such as a high charge/discharge voltage and a large charge/discharge capacity have been noticed.

Hitherto, as positive electrode active substances useful for high energy-type lithium ion secondary batteries exhibiting a 4 V-grade voltage, there are generally known $LiMn_2O_4$ having a spinel structure, $LiMnO_2$ having a zigzag layer structure, $LiCoO_2$, $LiCo_{1-x}Ni_xO_2$ and $LiNiO_2$ having a layer rock-salt structure, or the like. Among the secondary batteries using these active substances, lithium ion secondary batteries using $LiCoO_2$ are excellent in view of a high charge/discharge voltage and a large charge/discharge capacity thereof. However, owing to use of the expensive Co, various other positive electrode active substances have been studied as alternative substances of $LiCoO_2$.

On the other hand, lithium ion secondary batteries using $LiNiO_2$ have also been noticed because they have a high charge/discharge capacity. However, since the material $LiNiO_2$ tends to be deteriorated in thermal stability and durability upon charging and discharging, further improvements on properties thereof have been demanded.

Specifically, when lithium is released from $LiNiO_2$, the crystal structure of $LiNiO_2$ suffers from Jahn-Teller distortion since $Ni^{3+}$ is converted into $Ni^{4+}$. When the amount of Li released reaches 0.45, the crystal structure of such a lithium-released region of $LiNiO_2$ is transformed from hexagonal system into monoclinic system, and a further release of lithium therefrom causes transformation of the crystal structure from monoclinic system into hexagonal system. Therefore, when the charge/discharge reaction is repeated, the crystal structure of $LiNiO_2$ tends to become unstable, so that the resulting secondary battery tends to be deteriorated in cycle characteristics or suffer from occurrence of undesired reaction between $LiNiO_2$ and an electrolyte solution owing to release of oxygen therefrom, resulting in deterioration in thermal stability and storage characteristics of the battery. To solve these problems, various studies have been made on the $LiNiO_2$ materials to which Co, Al, Mn, Ti, etc., are added by substituting a part of Ni in $LiNiO_2$ therewith.

That is, by substituting a part of Ni in $LiNiO_2$ with different kinds of elements, it is possible to impart properties inherent to the respective substituting elements to the $LiNiO_2$. For example, in the case where a part of Ni in $LiNiO_2$ is substituted with Co, it is expected that the thus substituted $LiNiO_2$ exhibits a high charge/discharge voltage and a large charge/discharge capacity even when the amount of Co substituted is small. On the other hand, $LiMn_2O_4$ forms a stable system as compared to $LiNiO_2$ or $LiCoO_2$, but has a different crystal structure, so that the amounts of the substituting elements introduced thereto are limited.

In consequence, in order to obtain Co- or Mn-substituted $LiNiO_2$ having a high packing property and a stable crystal structure, it is required to use a nickel-cobalt-manganese-based precursor which is well controlled in composition, properties, crystallizability and particle size distribution.

In particular, the particle size distribution of the positive electrode active substance for non-aqueous secondary batteries such as $LiNiO_2$ has a large contribution to a packing property of a positive electrode material. Therefore, there is a strong demand for positive electrode active substances having a more uniform particle size distribution. For this reason, nickel-cobalt-manganese-based compound particles as a precursor of the $LiNiO_2$ substituted with different kinds of elements have also been required to have a uniform particle size and a less content of very fine particles.

It is conventionally known that nickel-cobalt-manganese-based compound particles are controlled in tap density, particle shape and particle size distribution (Patent Documents 1 to 4).

The technique describe in Patent Document 1 relates to spherical high-density cobalt/manganese co-precipitated nickel hydroxide having a tap density of not less than 1.5 g/cc.

In addition, in Patent Document 2, there is described a nickel/manganese co-precipitated composite oxide in which a transition metal element is uniformly incorporated in an atomic level in the form of a solid solution.

Further, in Patent Document 3, there is described a nickel/cobalt/manganese composite oxyhydroxide which is synthesized by reacting nickel/cobalt/manganese co-precipitated composite oxide aggregated particles with an oxidizing agent.

Furthermore, in Patent Document 4, there is described a nickel/cobalt/manganese composite hydroxide which is controlled in particle size distribution.

PRIOR ART DOCUMENTS

Patent Documents

Patent Document 1: Japanese Patent Application Laid-Open (KOKAI) No. 2002-201028
Patent Document 2: PCT WO 2002/078105
Patent Document 3: PCT WO 2004/092073
Patent Document 4: Japanese Patent Application Laid-Open (KOKAI) No. 2008-147068

SUMMARY OF THE INVENTION

Problems to be Solved by the Invention

However, the nickel-cobalt-manganese-based compound particles obtained in the above conventional techniques are still insufficient in suppression of generation of very fine particles, and nickel-cobalt-manganese-based compound particles which are not only free from the above problem but also have a sharp particle size distribution have not been obtained until now.

In consequence, an object of the present invention is to provide nickel-cobalt-manganese-based compound particles which have a uniform particle size and a less content of very fine particles, and exhibit a high crystallinity and a large primary particle diameter.

Means for Solving the Problem

The above technical task or object of the present invention can be achieved by the following aspects of the present invention.

That is, according to the present invention, there are provided nickel-cobalt-manganese-based compound particles having a volume-based average secondary particle diameter (D50) of 3.0 to 25.0 μm, in which the volume-based average secondary particle diameter (D50) and a half value width (W) of the peak in volume-based particle size distribution of secondary particles thereof satisfy the following relational formula 1 (Invention 1):

$$W \leq 0.4 \times D50. \qquad \text{(Relational Formula 1)}$$

Also, according to the present invention, there are provided the nickel-cobalt-manganese-based compound particles as described in the above Invention 1, wherein when a molar ratio (mol %) of Ni:Co:Mn in the particles is expressed by x:y:z, x is 5 to 65 mol %, y is 5 to 65 mol %, and z is 5 to 55 mol % with the proviso that a sum of x, y and z is 100 mol % (x+y+z=100 mol %) (Invention 2).

In addition, according to the present invention, there is provided a process for producing the nickel-cobalt-manganese-based compound particles as described in the above Invention 1 or 2, comprising the steps of:

preparing a reaction apparatus comprising a reactor equipped with a stirrer and a draft tube and connected with a concentrator;

previously introducing an alkali solution into the reactor; and continuously dropping a solution comprising metal salts comprising nickel, cobalt and manganese, and an alkali solution into the alkali solution previously introduced into the reactor from above a surface of the reaction solution to subject the resulting mixed solution to neutralization and precipitation reaction to thereby produce the nickel-cobalt-manganese-based compound particles, in which a part of a reaction slurry produced during the above reaction is withdrawn from a mid portion of the reactor and introduced into the concentrator, and the slurry concentrated in the concentrator is introduced again into the reactor such that a direction of the concentrated slurry introduced into the reactor is the same as a direction of a turning flow of the reaction slurry in the reactor to produce the nickel-cobalt-manganese-based compound particles, followed by subjecting the reaction slurry comprising the thus produced nickel-cobalt-manganese-based compound particles to filtration, washing with water and drying at a temperature of 150 to 250° C. (Invention 3).

Also, according to the present invention, there is provided a process for producing the nickel-cobalt-manganese-based compound particles as described in the above Invention 3, wherein sodium hydroxide and ammonia are used as the alkali solution (Invention 4).

Further, according to the present invention, there are provided lithium composite oxide particles comprising at least nickel, cobalt and manganese, and having a volume-based average secondary particle diameter (D50) of 3.0 to 25.0 μm, in which the volume-based average secondary particle diameter (D50) and a half value width (W) of the peak in volume-based particle size distribution of secondary particles thereof satisfy the following relational formula 2 (Invention 5):

$$W \leq 0.4 \times D50. \qquad \text{(Relational Formula 2)}$$

Also, according to the present invention, there are provided the lithium composite oxide particles as described in the above Invention 5, wherein when a molar ratio (mol %) of Ni:Co:Mn in the particles is expressed by x:y:z, x is 5 to 65 mol %, y is 5 to 65 mol %, and z is 5 to 55 mol % with the proviso that a sum of x, y and z is 100 mol % (x+y+z=100 mol %), and a molar ratio of Li to a total amount of nickel, cobalt and manganese [lithium/(nickel+cobalt+manganese)] is 0.90 to 1.20 (Invention 6).

Further, according to the present invention, there is provided a process for producing lithium composite oxide particles, comprising the steps of:

mixing the nickel-cobalt-manganese-based compound particles as described in the above Invention 1 or 2 with a lithium compound; and subjecting the resulting mixture to heat treatment at a temperature of 800 to 1100° C. (Invention 7).

Furthermore, according to the present invention, there is provided a non-aqueous electrolyte secondary battery using the lithium composite oxide particles as described in the above Invention 5 or 6 (Invention 8).

Effect of the Invention

The nickel-cobalt-manganese-based compound particles according to the present invention have a uniform particle size and a less content of very fine particles. As a result, it is expected that the lithium composite oxide produced from the nickel-cobalt-manganese-based compound particles can exhibit a good thermal stability owing to the positive electrode active substance, and the resulting battery can be prevented from suffering from swelling.

Further, the nickel-cobalt-manganese-based compound particles according to the present invention have a high crystallinity and a relatively large primary particle diameter. As a result, it is expected that the lithium composite oxide produced from the nickel-cobalt-manganese-based compound particles provide particles having a relatively large primary particle diameter without taking any specific measures for the calcination conditions, have a high capacity and an excellent rate characteristic, and can be enhanced in cycle characteristics not only at room temperature but also at a high temperature.

In addition, the lithium composite oxide particles according to the present invention have a uniform particle size and a less content of very fine particles. As a result, it is expected that the lithium composite oxide particles exhibit a good thermal stability owing to the positive electrode active substance, and the resulting battery can be prevented from suffering from swelling. In addition, it is expected that the lithium composite oxide particles according to the present invention exhibit a high capacity and an excellent rate characteristic and can be enhanced in cycle characteristics not only at room temperature but also at a high temperature.

BRIEF DESCRIPTION OF THE DRAWINGS

FIG. 1 is a schematic view of an apparatus used for producing the nickel-cobalt-manganese-based compound particles according to the present invention in which FIG. 1(A) is a schematic view which is viewed from above, and FIG. 1(B) is a schematic sectional view of the apparatus.

PREFERRED EMBODIMENTS FOR CARRYING OUT THE INVENTION

Figure 1:
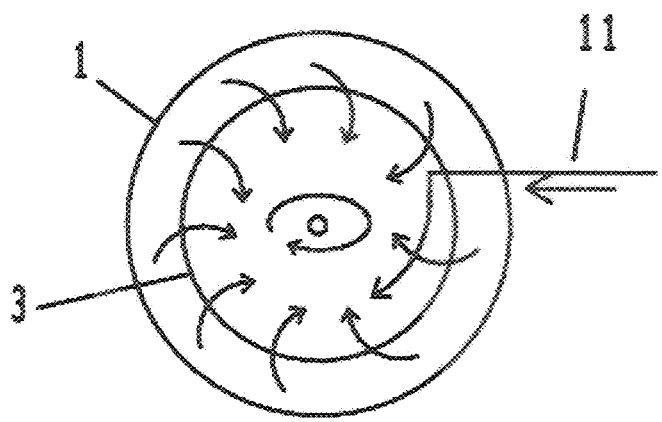
Figure 1:
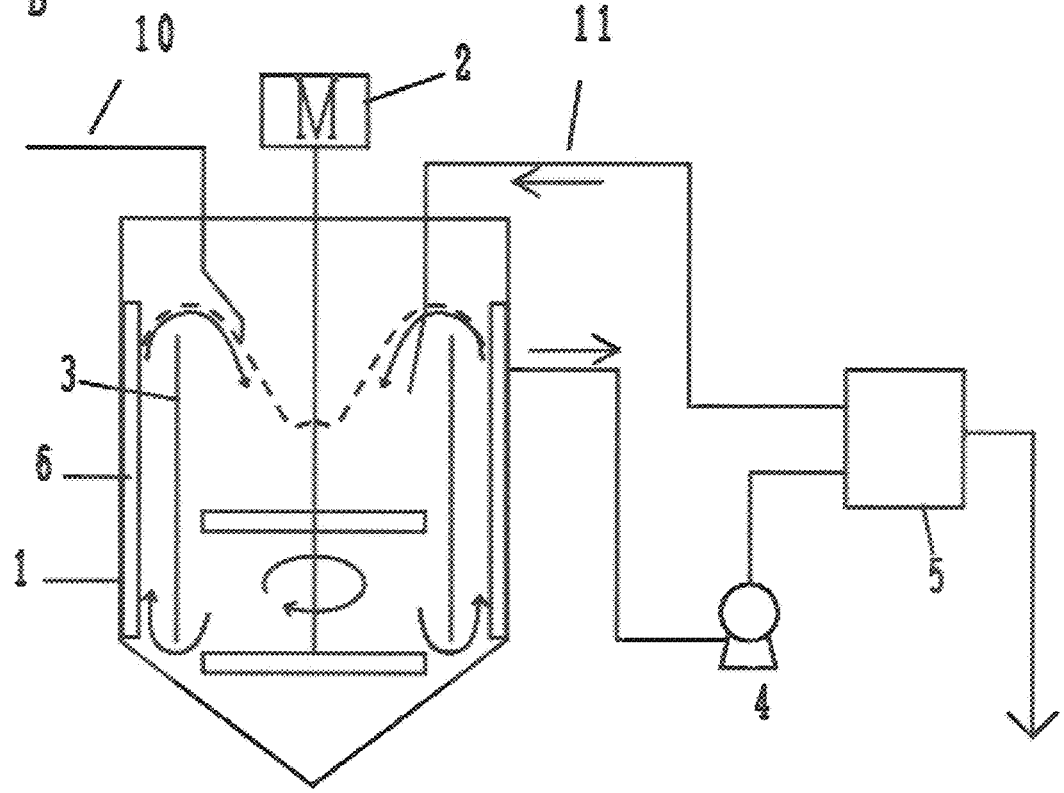

First, the construction of the present invention is described in more detail below.

The nickel-cobalt-manganese-based compound particles according to the present invention are described. The nickel-cobalt-manganese-based compound particles according to the present invention are precursor particles of lithium composite oxide particles which are obtained in the subsequent step in which the nickel-cobalt-manganese-based compound particles are mixed with a lithium compound, and the resulting mixture is subjected to heat treatment at a temperature of 800 to 1100° C. The nickel-cobalt-manganese-based compound particles typically mean a nickel-cobalt-manganese composite hydroxide, a nickel-cobalt-manganese composite oxyhydroxide or a nickel-cobalt-manganese composite oxide.

The nickel-cobalt-manganese-based compound particles according to the present invention have a volume-based average secondary particle diameter (D50) of 3.0 to 25.0 μm. When the volume-based average secondary particle diameter (D50) is less than 3.0 μm, it may be difficult to aggregate the particles, or the resulting aggregated particles, if obtained, tend to have a very low density. When the volume-based average secondary particle diameter (D50) is more than 25.0 μm, an electrode formed from lithium composite particles obtained using the nickel-cobalt-manganese-based compound particles tends to suffer from breakage, bending, removal of particles therefrom and exposure of particles on a surface thereof depending upon a thickness of the electrode. The volume-based average secondary particle diameter (D50) of the nickel-cobalt-manganese-based compound particles is preferably 4.0 to 23.0 μm.

In the nickel-cobalt-manganese-based compound particles according to the present invention, the volume-based average secondary particle diameter (D50) and a half value width (W) of the peak in volume-based particle size distribution of secondary particles thereof satisfy the following relational formula 1:

$$W \leq 0.4 \times D50. \quad \text{(Relational Formula 1)}$$

When the volume-based average secondary particle diameter (D50) and a half value width (W) of the peak in volume-based particle size distribution of secondary particles thereof satisfy the above relational formula 1, the nickel-cobalt-manganese-based compound particles according to the present invention can exhibit a uniform particle size distribution and a less content of very fine particles, so that the lithium composite oxide particles obtained from the nickel-cobalt-manganese-based compound particles can also exhibit an excellent particle size distribution.

In the nickel-cobalt-manganese-based compound particles according to the present invention, when a molar ratio (mol %) of Ni:Co:Mn in the particles is expressed by x:y:z, x is preferably 5 to 65 mol %, y is preferably 5 to 65 mol %, and z is preferably 5 to 55 mol % with the proviso that a sum of x, y and z is 100 mol % (x+y+z=100 mol %). When the composition of the nickel-cobalt-manganese-based compound particles is out of the above-specified range, it may be difficult to obtain a totally well-balanced condition between price of raw materials, production method of lithium composite oxide particles, physical properties, battery characteristics, and the like, so that any of the above items are deviated from preferred ranges thereof, resulting in ill-balanced condition therebetween. The compositional ratios of the nickel-cobalt-manganese-based compound particles are more preferably controlled such that when a molar ratio (mol %) of Ni:Co:Mn in the particles is expressed by x:y:z, x is 5 to 65 mol %, y is 5 to 55 mol %, and z is 5 to 35 mol %.

The nickel-cobalt-manganese-based compound particles according to the present invention have a BET specific surface area of 0.1 to 20.0 m²/g. It may be very difficult to industrially produce nickel-cobalt-manganese-based compound particles having a BET specific surface area of less than 0.1 m²/g. When the BET specific surface area of the nickel-cobalt-manganese-based compound particles is more than 20.0 m²/g, it may be difficult to obtain lithium composite oxide having a specific surface area as aimed from the nickel-cobalt-manganese-based compound particles, and further when an electrode is formed from the lithium composite oxide, the resulting battery may fail to exhibit a good thermal stability, a less occurrence of battery swelling, and excellent cycle characteristics at room temperature and at a high temperature.

The nickel-cobalt-manganese-based compound particles according to the present invention preferably have a tap density of 1.0 to 3.0 g/cm³. When the tap density of the nickel-cobalt-manganese-based compound particles is less than 1.0 g/cm³, the lithium composite oxide obtained therefrom may fail to exhibit a high compressed density and a high electrode (positive electrode) density. Even though the tap density of the nickel-cobalt-manganese-based compound particles is more than 3.0 g/cm³, there will occur no significant problems. However, it may be difficult to practically produce such nickel-cobalt-manganese-based compound particles having a tap density of more than 3.0 g/cm³. The tap density of the nickel-cobalt-manganese-based compound particles is more preferably 1.5 to 3.0 g/cm³ and still more preferably 1.8 to 2.8 g/cm³.

When subjecting the nickel-cobalt-manganese-based compound particles according to the present invention to powder X-ray diffraction (Cu—Kα), the crystallite size of a diffraction peak as measured at a diffraction angle 2θ of 19.3±0.5° is preferably 150 to 350 Å. When the crystallite size of a diffraction peak as measured at a diffraction angle 2θ of 19.3±0.5° is less than 150 Å, the nickel-cobalt-manganese-based compound particles tend to have a small primary particle thickness and a large specific surface area, and the lithium composite oxide obtained from the nickel-cobalt-manganese-based compound particles tend to hardly undergo crystal growth of primary particles thereof, so that when forming an electrode from the lithium composite oxide, it may be difficult to obtain a battery having a good thermal stability, a less occurrence of battery swelling, a high capacity, an excellent rate characteristic and excellent cycle characteristics at room temperature and at a high temperature. Even when the crystallite size of a diffraction peak as measured at a diffraction angle 2θ of 19.3±0.5° is more than 350 Å, there will occur no significant problems. However, it may be difficult to practically produce such particles having a crystallite size of more than 350 Å.

Next, the process for producing the nickel-cobalt-manganese-based compound particles according to the present invention is described.

The nickel-cobalt-manganese-based compound particles according to the present invention can be produced by dropping a solution comprising metal salts comprising nickel, cobalt and manganese, and an alkali solution into an alkali solution at the same time to subject the resulting mixed solution to neutralization and precipitation reaction to thereby obtain a reaction slurry comprising nickel-cobalt-manganese-based compound particles, followed by subjecting the reaction slurry to filtration, washing with water and drying at a temperature of 150 to 250° C.

Examples of the alkali solution used in the above process include aqueous solutions of sodium hydroxide, potassium hydroxide, sodium carbonate, ammonia and the like. Among these alkali solutions, a sodium hydroxide aqueous solution, a sodium carbonate aqueous solution or a mixed solution thereof is preferably used for the neutralization reaction. In addition, in the complex formation reaction, it is preferred to use an ammonia aqueous solution and an ammonium salt.

The amount of the alkali solution added in the neutralization reaction may be 1.0 equivalent per one equivalent of components to be neutralized which are included in the whole metal salts. However, the alkali solution is preferably added in an excessive alkali amount in order to well adjust the pH value of the reaction solution.

The ammonia aqueous solution and the ammonium salt used for the complex formation reaction is preferably added in such an amount that the concentration of ammonia in the reaction solution lies within the range of 0.01 to 2.00 mol/L.

The pH of the reaction solution is suitably adjusted to lie within the range of 10.0 to 13.0. When the pH of the reaction solution is less than 10.0, it may be difficult to aggregate the primary particles to form secondary particles thereof, or very fine particles tend to be undesirably generated so that the number of particles in the reaction solution tends to be undesirably increased. When the pH of the reaction solution is more than 13.0, the primary particles tend to suffer from plate-shaped crystal growth, so that the secondary particles tend to be less dense, and tend to be undesirably deteriorated in packing density. The pH of the reaction solution is more preferably 11.0 to 12.5.

Examples of the metal salts comprising nickel, cobalt and manganese (hereinafter occasionally referred to merely as "metal salts") include sulfuric acid salts, nitric acid salts, acetic acid salts or carbonic acid salts of nickel, cobalt and manganese. Among these metal salts, more preferred are nickel sulfate, cobalt sulfate and manganese sulfate, and still more preferred is combination of these salts.

The solutions comprising the respective metal salts may be prepared and added individually upon the synthesis reaction. However, it is preferred that the mixed solution comprising these metal salts be previously prepared.

Also, the dropping rate (m value) of the metal salt-containing solution is preferably controlled to lie within the range of 0.005 to 0.300 mol/(L·h). Meanwhile, the unit represents a total molar concentration of nickel, cobalt and manganese to be dropped per a reaction solution volume of 1 L and a reaction time of 1 hr. The dropping rate (m value) of the metal salt-containing solution is more preferably 0.010 to 0.280 mol/(L·h). Further, in order to stabilize a concentration of the respective metal salts, sodium sulfate may be previously incorporated into the reaction mother solution.

The neutralization and precipitation reaction may be conducted by previously replacing an inside atmosphere of the reaction apparatus with an inert gas before dropping the metal salt-containing solution thereto.

The reaction temperature is preferably not lower than 30° C. and more preferably 30 to 60° C.

Different kinds of metals such as Mg, Al, Ti, Zr and Sn may also be added in a very small amount, if required. In this case, the metals may be added by any suitable method such as a method of previously mixing these metals with the nickel salt, cobalt salt and manganate salt, a method of adding these metals together with the nickel salt, cobalt salt and manganate salt at the same time, and a method of adding these metals to the reaction solution in the course of the reaction.

In the present invention, the obtained reaction slurry is subjected to filtration, washing with water and then drying at a temperature of 150 to 250° C. When the drying temperature is lower than 150° C., the particles tend to suffer from dehydration reaction to release water therefrom depending upon environmental conditions to which the particles are exposed, which results in poor fluidity and poor handling property of the obtained particles. On the other hand, even when the drying temperature is higher than 250° C., there will occur no significant problems. However, from the industrial viewpoints, the drying temperature is preferably lower than 250° C.

The production process of the present invention is preferably conducted using an reaction apparatus shown in FIG. 1. As shown in FIG. 1(B), the reaction apparatus used in the production process includes a reactor 1 equipped with stirrer 2 and a draft tube 3, and a concentrator 5 connected to the reactor. In the present invention, an alkali solution is previously introduced into the reactor, and then the metal salt-containing solution and an alkali solution are continuously dropped into the alkali solution previously introduced into the reactor from above a surface of the reaction solution to subject the resulting mixed solution to neutralization and precipitation reaction to thereby produce the nickel-cobalt-manganese-based compound particles. In the above reaction, a part of the reaction slurry produced during the reaction is withdrawn from a mid portion of the reactor and introduced into the concentrator, and the slurry concentrated in the concentrator is introduced again into the reactor such that the direction of the concentrated slurry to be introduced again into the reactor is the same as a direction of a turning flow of the reaction slurry in the reactor.

After conducting the successive steps which include dropping of the raw materials, the neutralization and precipitation reactions and concentration of the reaction slurry in order to allow growth of the nickel-cobalt-manganese-based compound particles having a desired particle diameter, the resulting particles are preferably subjected to filtration, washing with water and then drying at a temperature of 150 to 250° C.

In the present invention, the reaction slurry is preferably withdrawn from a mid portion of the reactor. If the reaction slurry is withdrawn from a lower portion of the reactor, unreacted raw materials tend to be undesirably discharged therefrom. Also, if the reaction slurry is withdrawn from an upper portion of the reactor, raw materials or air bubbles tend to be undesirably discharged therefrom. Meanwhile, the mid portion of the reactor means that assuming the level of a bottom surface of the reaction solution in the reactor is 0% and the level of an upper surface of the reaction solution in the reactor is 100%, the mid portion corresponds to a portion of 30 to 70% and preferably a portion of 40 to 60%.

When the slurry concentrated in the concentrator is introduced again into the reactor as shown in FIG. 1 (A), it is preferred that the direction of the concentrated slurry introduced is the same as the direction of a turning flow of the reaction slurry in the reactor. Thus, by introducing and adding the concentrated slurry into the reactor so as not to disturb the stirring condition of the reaction slurry in the reactor, it is possible to suppress generation of very fine particles.

The amount of the reaction slurry to be circulated between the reactor and the concentrator is preferably controlled to such an extent that the stirring condition of the reaction slurry in the reactor is kept unchanged. The concentration procedure is preferably conducted at a rate capable of filtering the raw material solution to be dropped without delay. The filtering method may be either a continuous method or an intermittent method. In addition, an upper portion of the reactor and an upper portion of the concentrator are preferably always replaced with an inert gas.

The reaction time may vary depending upon the particle diameter of the aimed particles and is therefore not particularly limited. Also, the upper limit of a concentration of the reaction solution is not particularly limited as long as the reaction slurry is free from deposition within conduits owing to its properties such as viscosity, and the facility can be stably operated without clogging. In practice, the upper limit of a concentration of the reaction solution is preferably about 20 mol/L.

Next, the lithium composite oxide particles which are produced by using the nickel-cobalt-manganese-based compound particles according to the present invention are described.

The lithium composite oxide particles according to the present invention preferably have an average secondary particle diameter of 3.0 to 25.0 μm and a BET specific surface area of 0.10 to 1.50 m$^2$/g.

The lithium composite oxide particles according to the present invention preferably have a BET specific surface area of 0.10 to 1.50 m$^2$/g. It may be very difficult to industrially produce lithium composite oxide particles having a BET specific surface area of less than 0.10 m$^2$/g. When the BET specific surface area of the lithium composite oxide particles is more than 1.50 m$^2$/g, the battery using an electrode formed from the lithium composite oxide particles may fail to exhibit a good thermal stability and a less occurrence of battery swelling, and excellent cycle characteristics at room temperature and at a high temperature. The BET specific surface area of the lithium composite oxide particles is more preferably 0.10 to 1.30 m$^2$/g.

The lithium composite oxide particles according to the present invention have a volume-based average secondary particle diameter (D50) of 3.0 to 25.0 μm. When the volume-based average secondary particle diameter (D50) is less than 3.0 μm, the resulting particles tend to have a very low density. When the volume-based average secondary particle diameter (D50) is more than 25.0 μm, an electrode formed from the lithium composite particles tends to suffer from breakage, bending, removal of particles therefrom and exposure of particles on a surface thereof depending upon a thickness of the electrode. The volume-based average secondary particle diameter (D50) of the lithium composite oxide particles is preferably 4.0 to 23.0 μm.

In the lithium composite oxide particles according to the present invention, the volume-based average secondary particle diameter (D50) and a half value width (W) of the peak in volume-based particle size distribution of secondary particles thereof satisfy the following relational formula 2:

$$W \leq 0.4 \times D50. \quad \text{(Relational Formula 2)}$$

In the lithium composite oxide particles according to the present invention, when the volume-based average secondary particle diameter (D50) and a half value width (W) of the peak in volume-based particle size distribution of secondary particles thereof satisfy the above relational formula 2, it is possible to produce lithium composite oxide particles having a uniform particle size distribution and a less content of very fine particles.

The compositional ratios of the lithium composite oxide particles according to the present invention are substantially the same as the compositional ratios of the nickel-cobalt-manganese-based compound particles. In the lithium composite oxide particles, when a molar ratio (mol %) of Ni:Co:Mn in the particles is expressed by x:y:z, x is preferably 5 to 65 mol %, y is preferably 5 to 65 mol %, and z is preferably 5 to 55 mol % with the proviso that a sum of x, y and z is 100 mol % (x+y+z=100 mol %). When the composition ratios of the lithium composite oxide particles are out of the above-specified ranges, it may be difficult to obtain a totally well-balanced condition between price of raw materials, production method of forming the lithium composite oxide particles, physical properties, battery characteristics, and the like, so that any of the above items are deviated from preferred ranges thereof, resulting in ill-balanced condition therebetween. The compositional ratios of the lithium composite oxide particles are more preferably controlled such that when a molar ratio (mol %) of Ni:Co:Mn in the particles is expressed by x:y:z, x is 5 to 65 mol %, y is 5 to 55 mol %, and z is 5 to 35 mol %.

In the lithium composite oxide particles according to the present invention, the molar ratio of Li to a total amount of the metals [lithium/(nickel+cobalt+manganese)] is preferably 0.90 to 1.20 and more preferably 0.95 to 1.15.

The lithium composite oxide particles according to the present invention can be produced by mixing the above nickel-cobalt-manganese-based compound particles of the present invention with a lithium compound according to an ordinary method, and heat-treating the resulting mixture in a temperature range of 800 to 1100° C.

The mixing treatment of the nickel-cobalt-manganese-based compound particles of the present invention and the lithium compound may be conducted by either a dry method or a wet method as long as these materials can be uniformly mixed with each other. As the lithium compound, there may be used either lithium hydroxide or lithium carbonate. Among these lithium compounds, lithium carbonate is preferably used.

The mixing ratio of lithium to a total molar number of nickel, cobalt and manganese in the nickel-cobalt-manganese-based compound particles of the present invention is preferably 0.90 to 1.20.

Next, the positive electrode produced using the lithium composite oxide particles according to the present invention is described.

When producing the positive electrode using the lithium composite oxide particles according to the present invention, a conductive agent and a binder are added to and mixed with the lithium composite oxide particles by an ordinary method. Examples of the preferred conductive agent include acetylene black, carbon black and graphite. Examples of the preferred binder include polytetrafluoroethylene and polyvinylidene fluoride.

The secondary battery produced by using the positive electrode active substance comprising the lithium composite oxide particles according to the present invention comprises the above positive electrode, a negative electrode and an electrolyte.

Examples of a negative electrode active substance which may be used for production of the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

<Function>

The most important point of the present invention resides in that by using the nickel-cobalt-manganese-based compound precursor having a uniform particle size, a less content of very fine particles, a high crystallinity and a relatively large primary particle diameter as a precursor of the lithium composite oxide particles, it is possible to obtain lithium composite oxide particles having a uniform particle size, a less content of very fine particles, a large primary particle diameter and a small specific surface area, so that the battery using an electrode formed from the lithium composite oxide particles can exhibit a good thermal stability and a less occurrence of battery swelling, as well as a high capacity, an excellent rate characteristic and excellent cycle characteristics at room temperature and at a high temperature.

In the case of a continuous method (overflow method), since formation of crystal nucleus and growth reaction are always caused at the same time, very fine particles tend to be present and the particle size distribution tends to be widened. Owing to the very fine particles always generated, it may be difficult to produce particles having a particle diameter as large as more than 15 μm. Further, the concentration (solid content) of the reaction solution depends upon not only the concentration of the raw materials but also the amount of the alkali solution to be dropped simultaneously therewith, so that it may be therefore difficult to increase the concentration of the reaction solution to a sufficient extent. As a result, since a sufficient shear force is hardly applied to the particles, it may be difficult to obtain the particles having a high density.

On the other hand, since the production process of the present invention is a batch type method, there occurs no generation of very fine particles, and the resulting particles can be readily controlled in particle size. Therefore, it is possible to produce the nickel-cobalt-manganese-based compound precursor which has a uniform particle size, a less content of very fine particles, a high crystallinity and a relatively large primary particle diameter.

In addition, in the present invention, the reactor and the concentrator are connected to each other to circulate the reaction slurry between the reactor and the concentrator, and the concentrated slurry fed from the concentrator is introduced into the reactor such that the direction of the concentrated slurry introduced is the same as the direction of a turning flow of the reaction slurry in the reactor. As a result, it is possible to introduce and add the concentrated slurry into the reactor without disturbing the stirring condition of the reaction slurry in the reactor, so that it is possible to obtain the nickel-cobalt-manganese-based compound particles having a uniform particle size distribution.

EXAMPLES

Next, the present invention are described in more detail by the following Examples. The following Examples are only illustrative and are not intended to limit the present invention thereto. The evaluation methods used in the following Examples and Comparative Examples are as follows.

The compositions of the nickel-cobalt-manganese-based compound particles and the lithium composite oxide particles were measured using a plasma emission spectroscopic apparatus "SPS 4000" manufactured by Seiko Denshi Kogyo Co., Ltd.

The particle shapes of the nickel-cobalt-manganese-based compound particles and the lithium composite oxide particles were observed using a scanning electron microscope "SEM-EDX" equipped with an energy disperse type X-ray analyzer (manufactured by Hitachi High-Technologies Corp.).

The volume-based average secondary particle diameter (D50) and the half value width (W) of the peak in volume-based particle size distribution of secondary particles of the nickel-cobalt-manganese-based compound particles and the lithium composite oxide particles were measured using a particle size distribution measuring apparatus "MICROTRACK HRA 9320-X100" manufactured by Nikkiso Co., Ltd.

The specific surface areas of the nickel-cobalt-manganese-based compound particles and the lithium composite oxide particles were measured by BET method using "Macsorb HM model-1208" manufactured by Mountech Co., Ltd.

The tap density of the nickel-cobalt-manganese-based compound particles was determined as follows. That is, 40 g of sample particles was packed into a 100 mL measuring cylinder and then tapped using "TAP DENSER KYT-3000" manufactured by Seishin Enterprise Co., Ltd., 500 times to measure a density of the particles tapped.

The identification of the nickel-cobalt-manganese-based compound particles and the lithium composite oxide particles was conducted and evaluated using a powder X-ray diffractometer (manufactured by RIGAKU Corp.; Cu—Kα; 40 kV; 40 mA). Also, the crystallite size of diffraction peak as measured at a diffraction angle 2θ of 19.3±0.5° was calculated from the diffraction peak observed upon the above evaluation.

<Positive Electrode Active Substance>

Battery characteristics of the positive electrode active substance were evaluated as follows. That is, the positive electrode, negative electrode and electrolyte solution were prepared by the following method to produce a coin cell.

<Production of Positive Electrode>

The positive electrode active substance, acetylene black and graphite both serving as a conductive agent, and polyvinylidene fluoride as a binder, were accurately weighed such that the weight ratio therebetween was 94:3:3, and dispersed in N-methyl-2-pyrrolidone, and the resulting dispersion was fully mixed using a high-speed kneader to prepare a compounding agent slurry for the positive electrode. The thus prepared slurry was applied onto an aluminum foil as a current collector using a 150 μm doctor blade, and dried at 120° C. The resulting dried sheet was blanked into a 16 mmϕ disk shape to produce a positive electrode plate.

<Production of Negative Electrode>

A metallic lithium foil was blanked into a 16 mmϕ disk shape to produce a negative electrode.

<Preparation of Electrolyte Solution>

Into a mixed solution comprising ethylene carbonate and dimethyl carbonate at a volume ratio of 1:2 was dissolved 1 mol/L of lithium phosphate hexafluoride (LiPF$_6$) as an electrolyte to thereby prepare an electrolyte solution.

<Assembly of Coin Cell>

In a glove box placed in an argon atmosphere, the above positive electrodes and negative electrodes were disposed in a SUS316L casing through a polypropylene separator, and the electrolyte solution was filled in the casing to produce a coil cell of 2032 type.

<Evaluation of Battery>

The coin cell thus produced was subjected to charge/discharge test for secondary batteries. In the room temperature and high temperature cycle tests, the following measuring conditions were used. That is, the coin cell was subjected to one charge/discharge cycle at 0.1 C and 99 charge/discharge cycles at 1 C until reaching 201 cycles in total under the condition of a cut-off voltage between 3.0 V and 4.3 V to determine respective discharge capacities. Meanwhile, these measurements were carried out in a constant temperature oven maintained at 25° C. (room temperature) and at 60° C. (high temperature).

The rate test was carried out under the following measuring conditions. That is, the coin cell was charged at a constant rate of 0.1 C, and discharged at rates of 0.1 C, 1 C, 2 C and 5 C under the condition of a cut-off voltage between 3.0 V and 4.3 V to measure a rate characteristic thereof. Meanwhile, these measurements were carried out in a constant temperature oven maintained at 25° C.

Example 1

Production of Nickel-Cobalt-Manganese-Based Compound Particles

A reactor having an effective capacity of 10 L equipped with a draft tube, a baffle and a vane-type stirrer was filled with 8 L of ion-exchanged water. While fully stirring, a temperature within the reactor was adjusted to 40° C., and then a 4 mol/L sodium hydroxide aqueous solution was dropped into the reactor such that the pH value of the solution in the reactor was adjusted to 12.0. In addition, a 4 mol/L ammonia aqueous solution was dropped into the reactor in such an amount that the ammonia concentration of the reaction solution in the reactor was adjusted to 0.80 mol/L. Then, a mixed aqueous solution comprising cobalt sulfate, nickel sulfate and manganese sulfate at a concentration of 1.5 mol/L for each salt was continuously supplied to the reactor at an average feed rate of 0.08 mol/(L·hr). At the same time, a 4 mol/L sodium hydroxide aqueous solution and a 4 mol/L ammonia aqueous solution were continuously supplied to the reactor such that the pH value of the reaction solution in the reactor was adjusted to 12 and the ammonia concentration of the reaction solution in the reactor was adjusted to 0.8 mol/L. A part of a slurry of nickel-cobalt-manganese-based compound particles produced were rapidly continuously withdrawn from a mid portion of the reactor (a position of 50% from a bottom of the reaction solution), and then the concentrated slurry concentrated in a 0.4 L concentrator connected to the reactor was returned into the reactor such that the direction of the concentrated slurry introduced was the same as the direction of a turning flow of the reaction slurry in the reactor whereby the particles were grown until reaching an average particle diameter as aimed. At this time, the concentration of the nickel-cobalt-manganese-based compound particles in the reactor was 4 mol/L.

Figure 2:
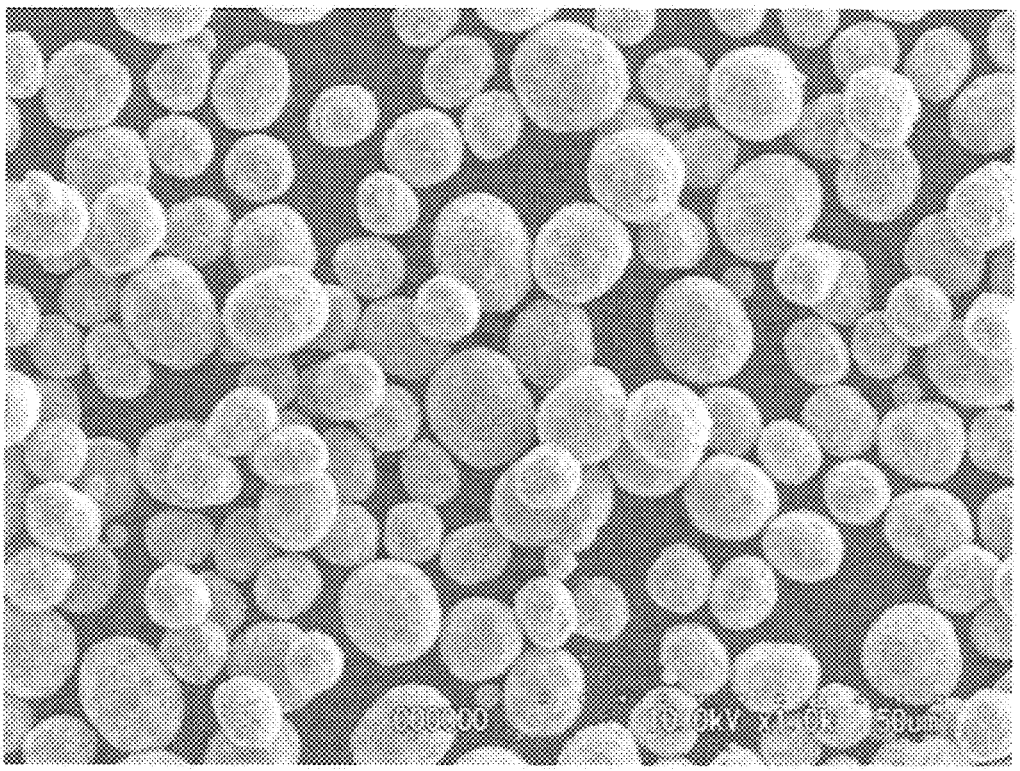
FIG. 2 is an electron micrograph (SEM) of the nickel-cobalt-manganese-based compound particles obtained in Example 1 (magnification: ×1000 times).
Figure 3:
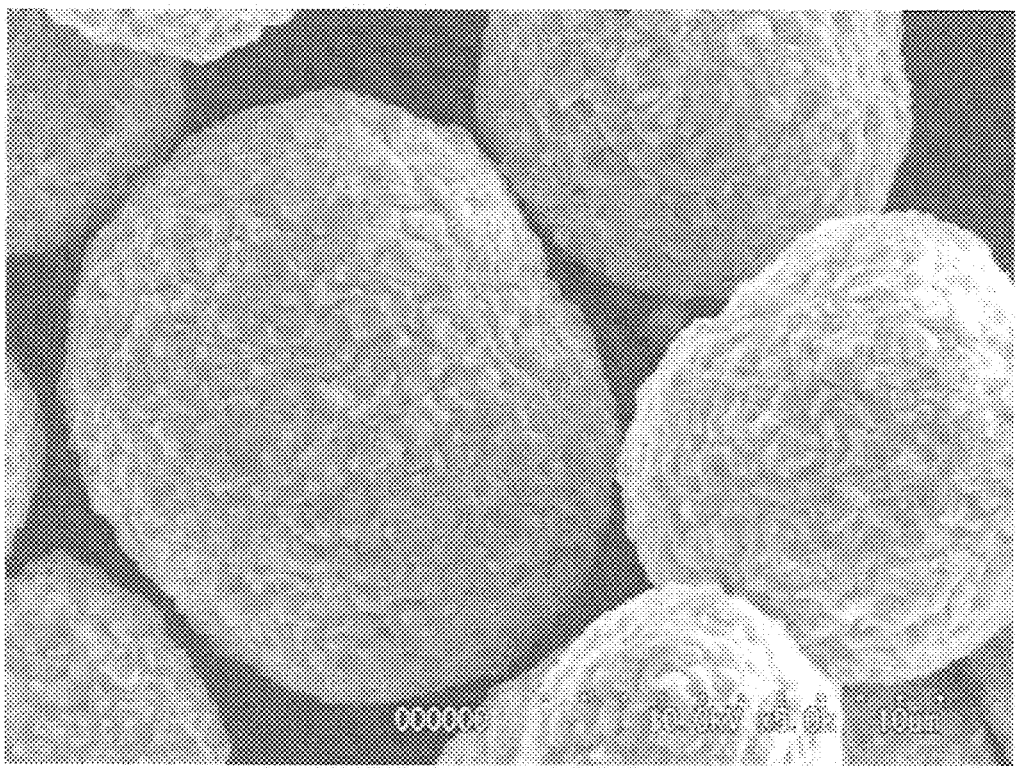
FIG. 3 is an electron micrograph (SEM) of the nickel-cobalt-manganese-based compound particles obtained in Example 1 (magnification: ×5000 times).
Figure 4:
FIG. 4 is an electron micrograph (SEM) of the nickel-cobalt-manganese-based compound particles obtained in Example 1 (magnification: ×25000 times).
Figure 5:
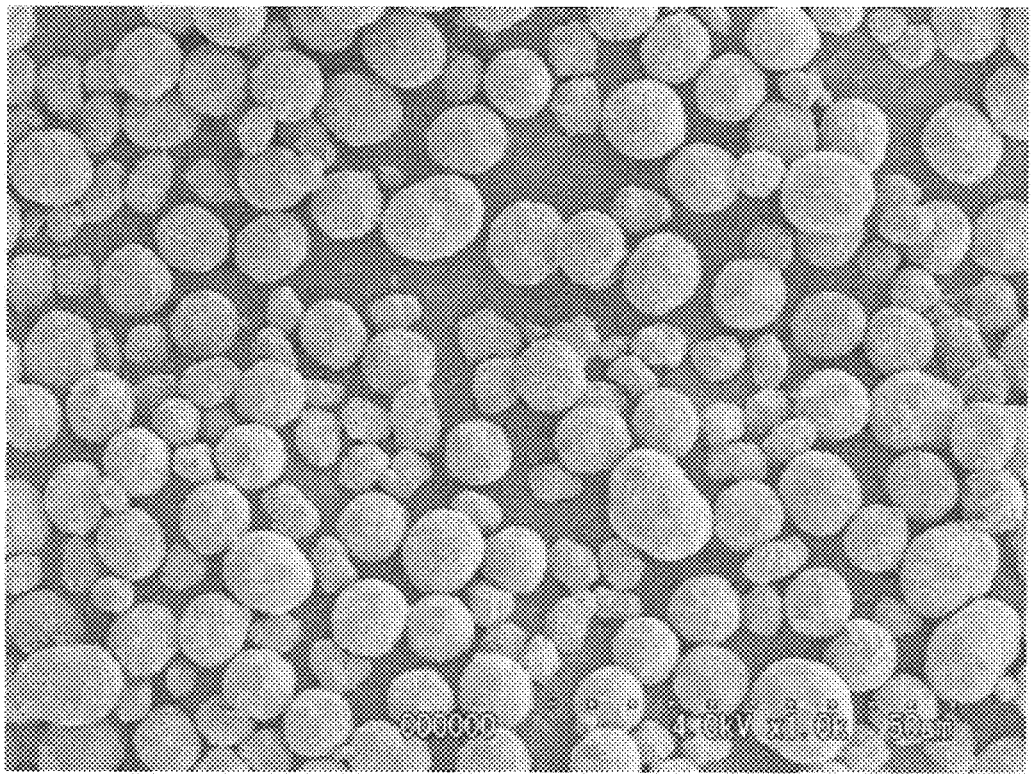
FIG. 5 is an electron micrograph (SEM) of the nickel-cobalt-manganese-based compound particles obtained in Example 2 (magnification: ×1000 times).
Figure 6:
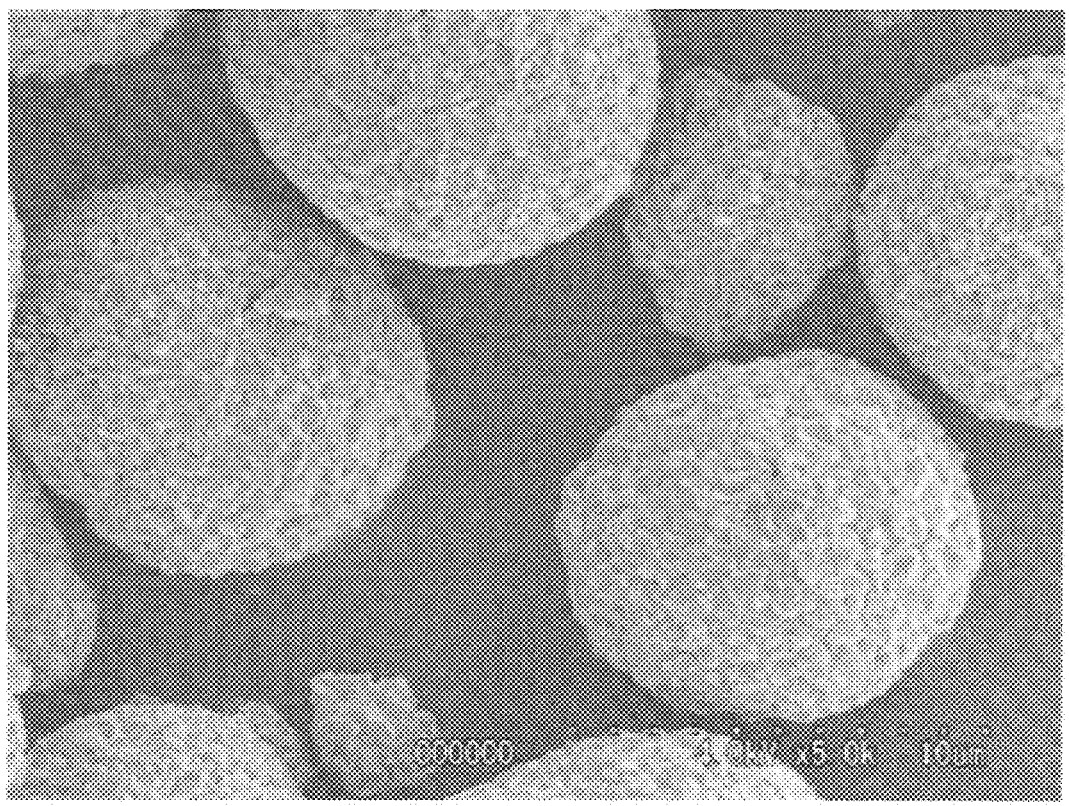
FIG. 6 is an electron micrograph (SEM) of the nickel-cobalt-manganese-based compound particles obtained in Example 2 (magnification: ×5000 times).
Figure 7:
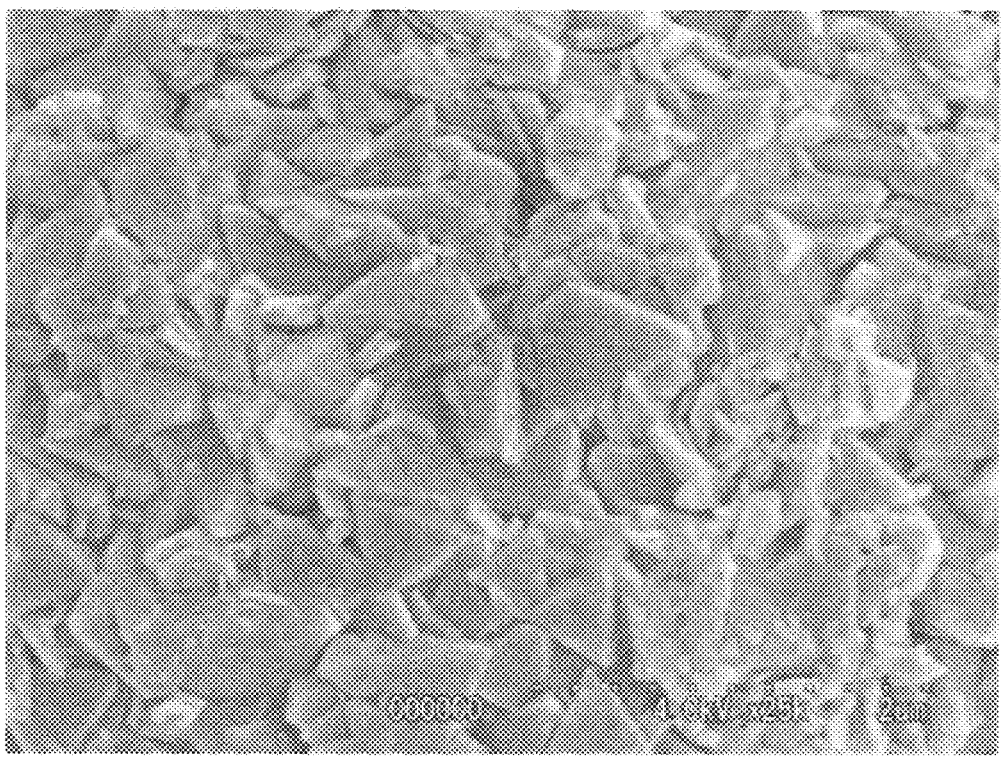
FIG. 7 is an electron micrograph (SEM) of the nickel-cobalt-manganese-based compound particles obtained in Example 2 (magnification: ×25000 times).
Figure 8:
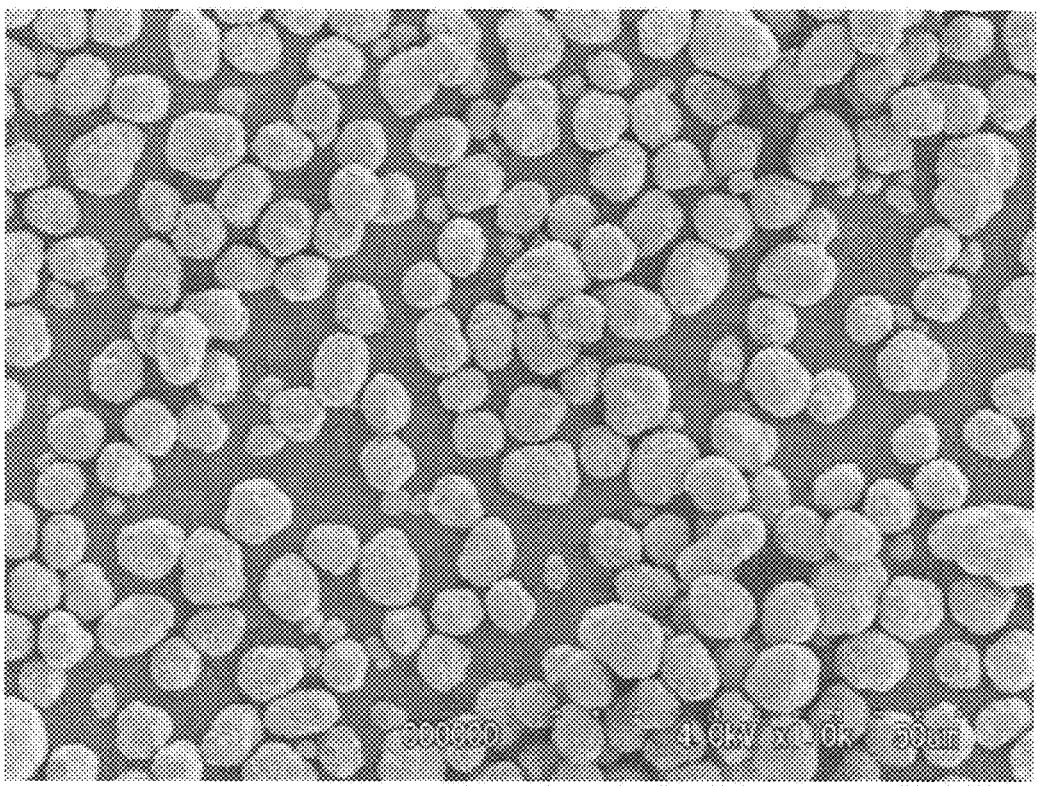
FIG. 8 is an electron micrograph (SEM) of the nickel-cobalt-manganese-based compound particles obtained in Example 3 (magnification: ×1000 times).
Figure 9:
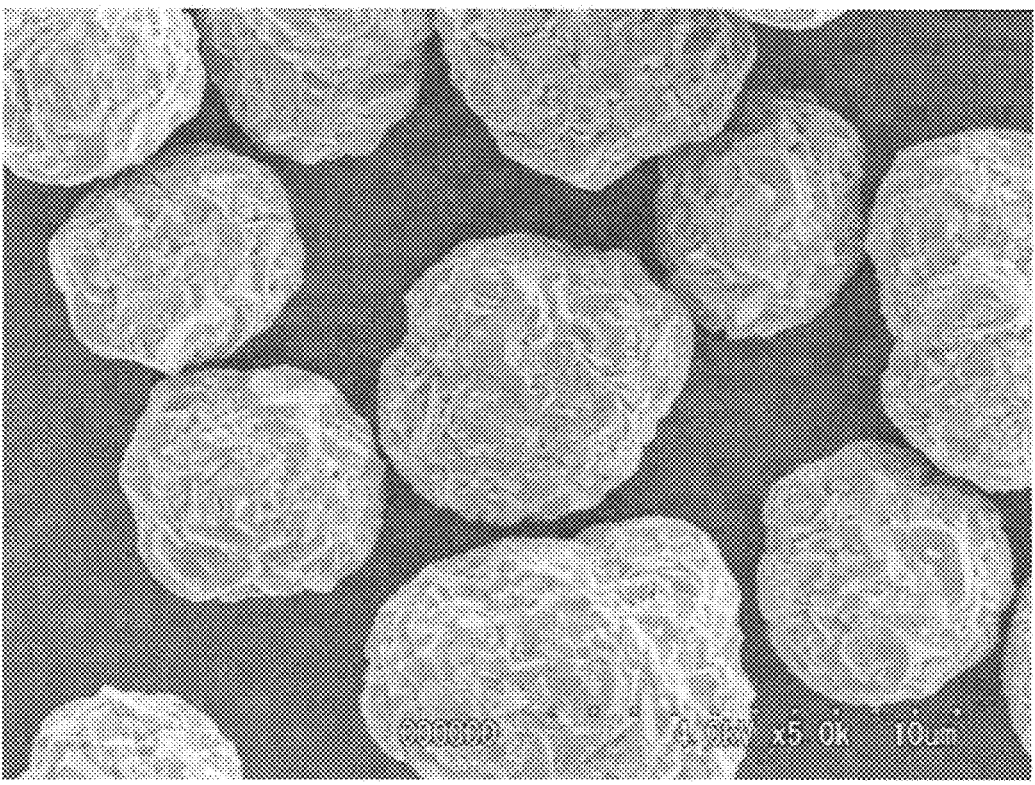
FIG. 9 is an electron micrograph (SEM) of the nickel-cobalt-manganese-based compound particles obtained in Example 3 (magnification: ×5000 times).
Figure 10:
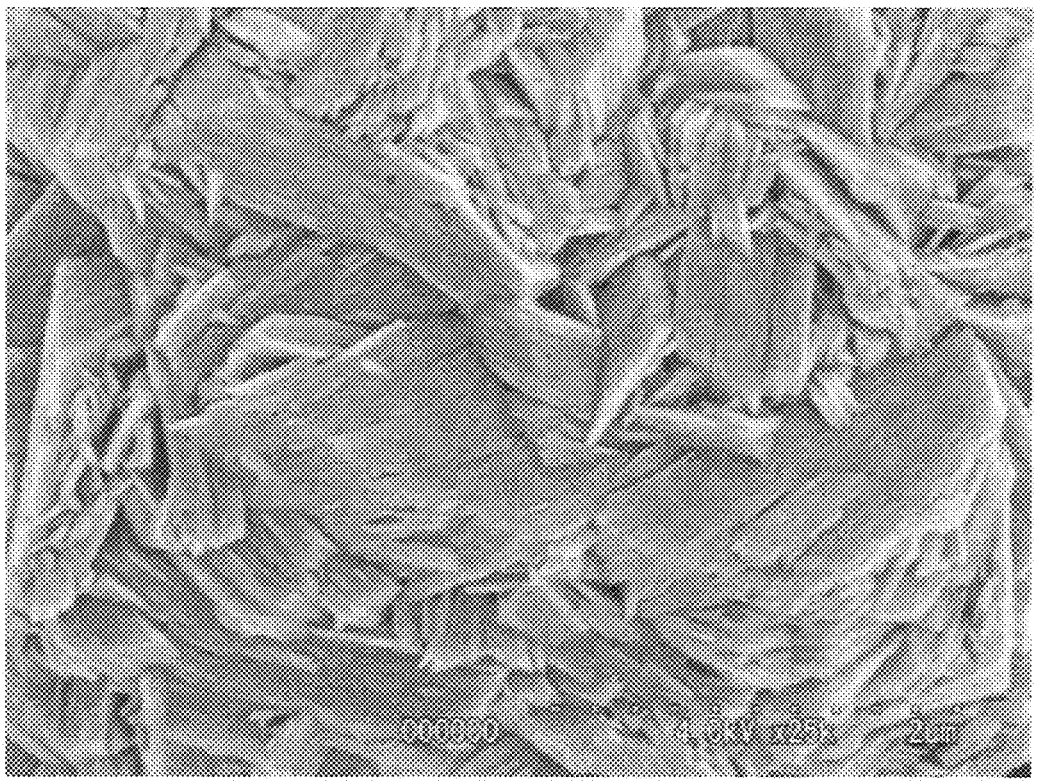
FIG. 10 is an electron micrograph (SEM) of the nickel-cobalt-manganese-based compound particles obtained in Example 3 (magnification: ×25000 times).
Figure 11:
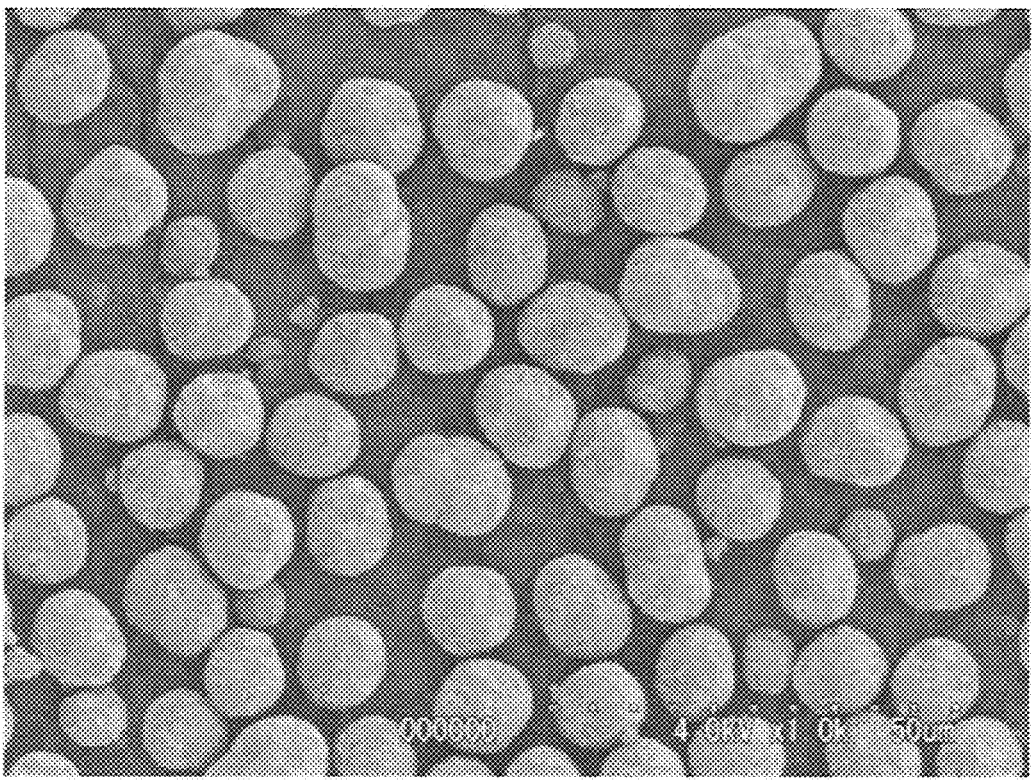
FIG. 11 is an electron micrograph (SEM) of the nickel-cobalt-manganese-based compound particles obtained in Example 5 (magnification: ×1000 times).
Figure 12:
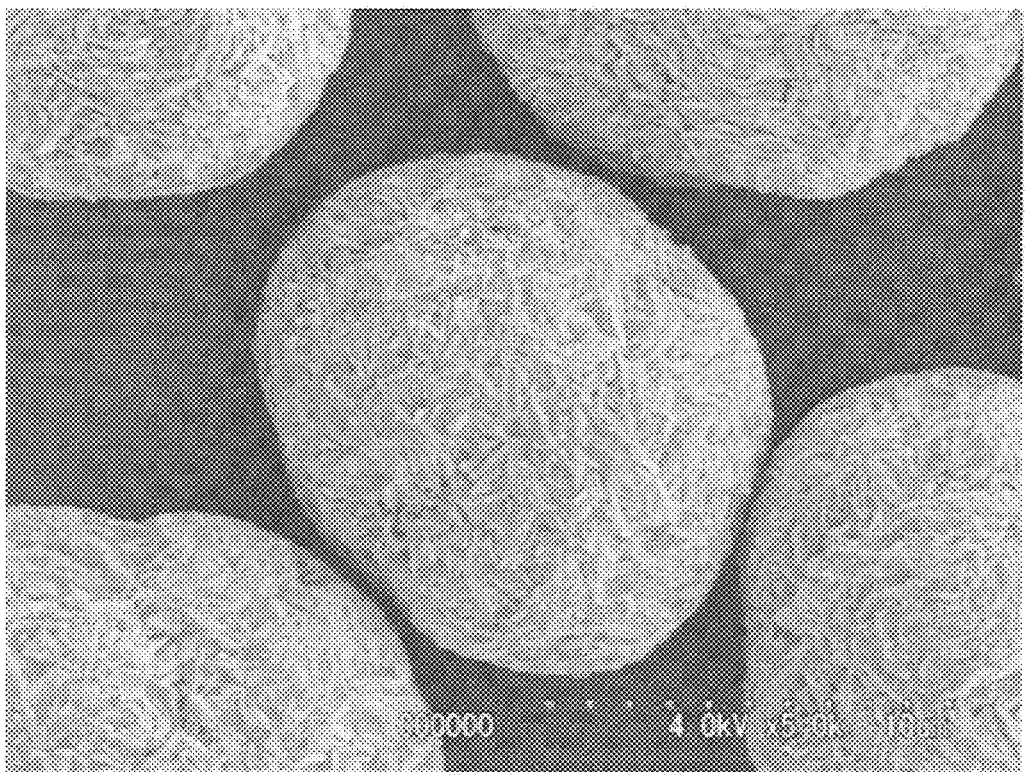
FIG. 12 is an electron micrograph (SEM) of the nickel-cobalt-manganese-based compound particles obtained in Example 5 (magnification: ×5000 times).
Figure 13:
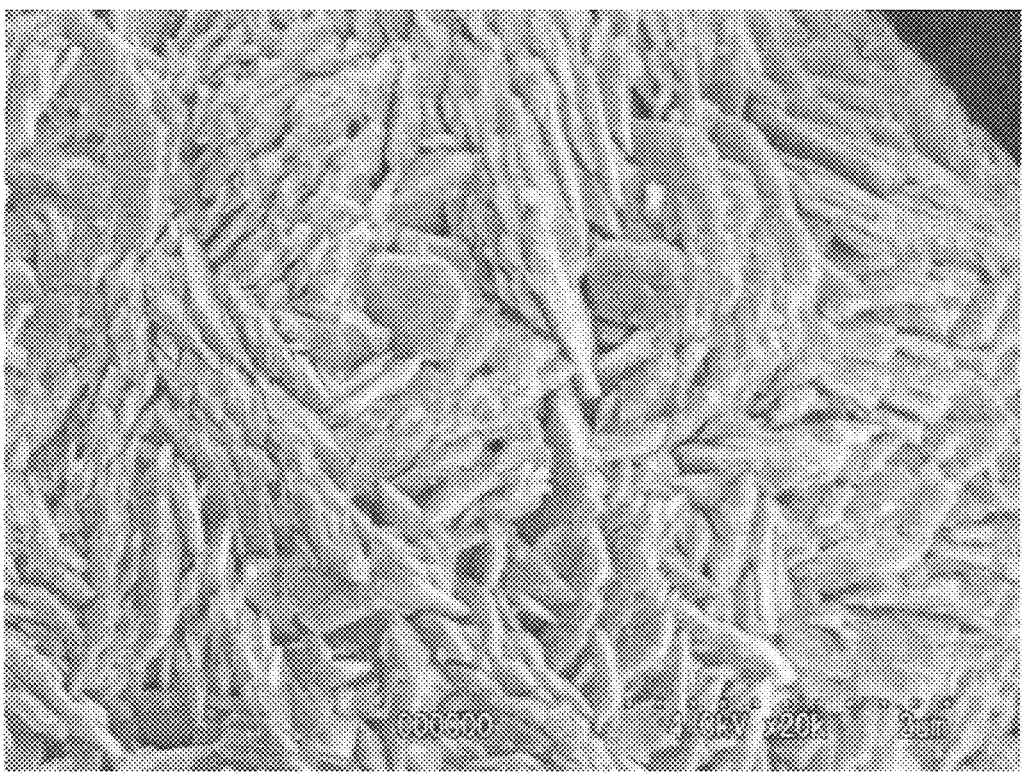
FIG. 13 is an electron micrograph (SEM) of the nickel-cobalt-manganese-based compound particles obtained in Example 5 (magnification: ×20000 times).
Figure 14:
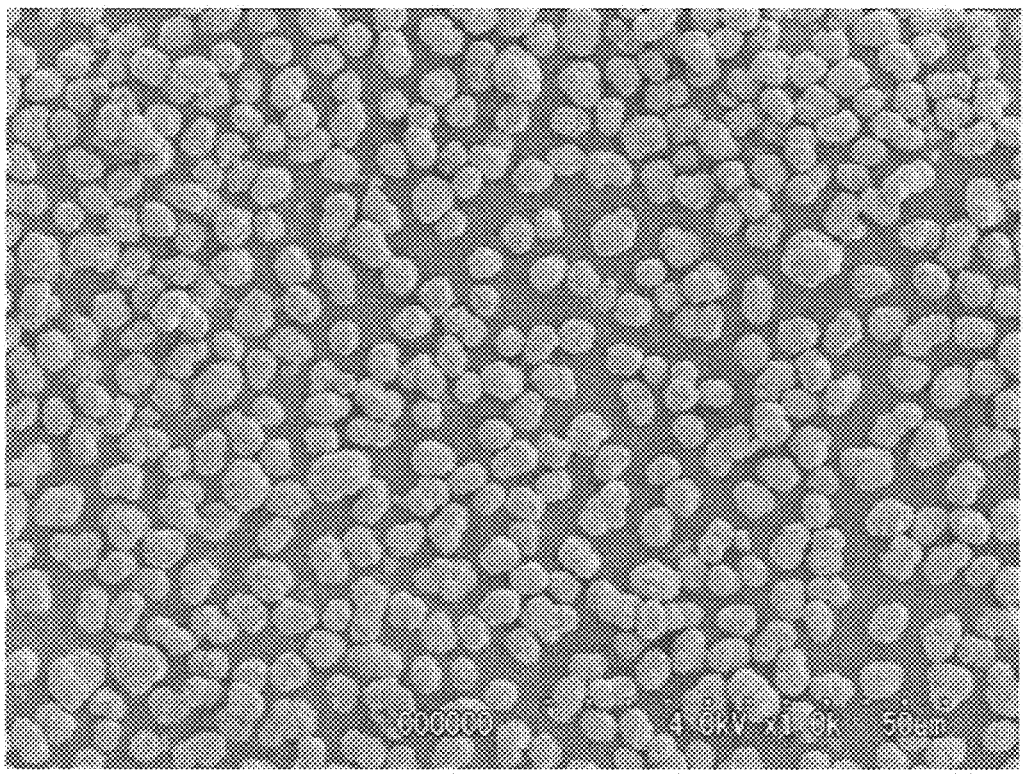
FIG. 14 is an electron micrograph (SEM) of the nickel-cobalt-manganese-based compound particles obtained in Example 6 (magnification: ×1000 times).
Figure 15:
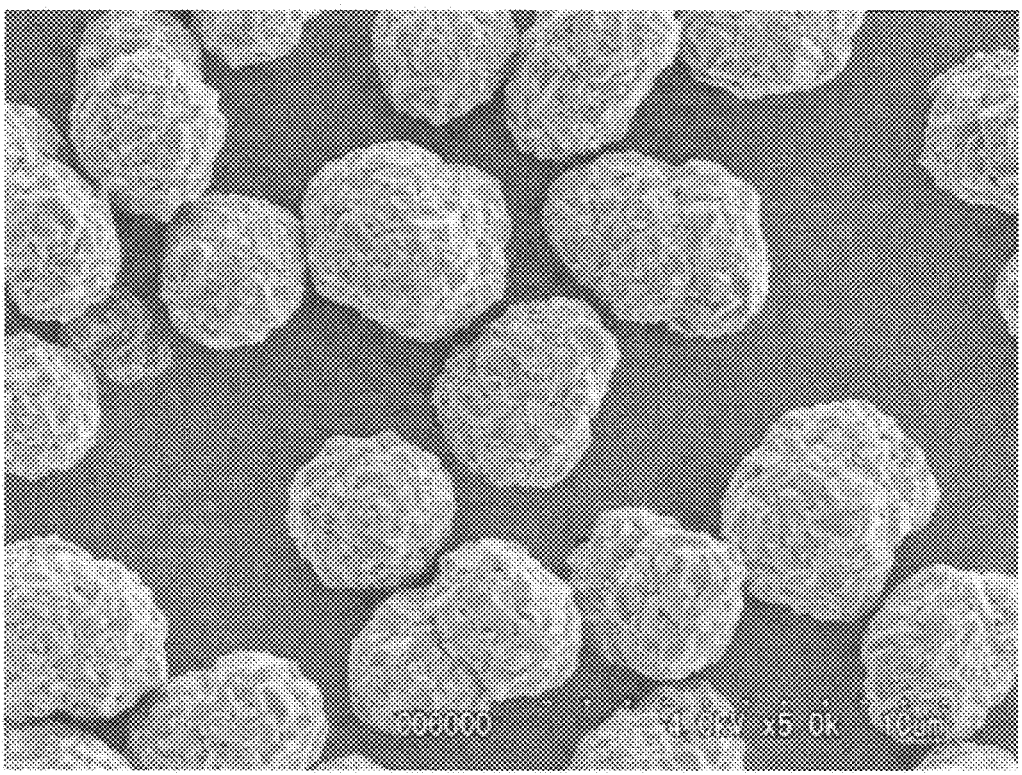
FIG. 15 is an electron micrograph (SEM) of the nickel-cobalt-manganese-based compound particles obtained in Example 6 (magnification: ×5000 times).
Figure 16:
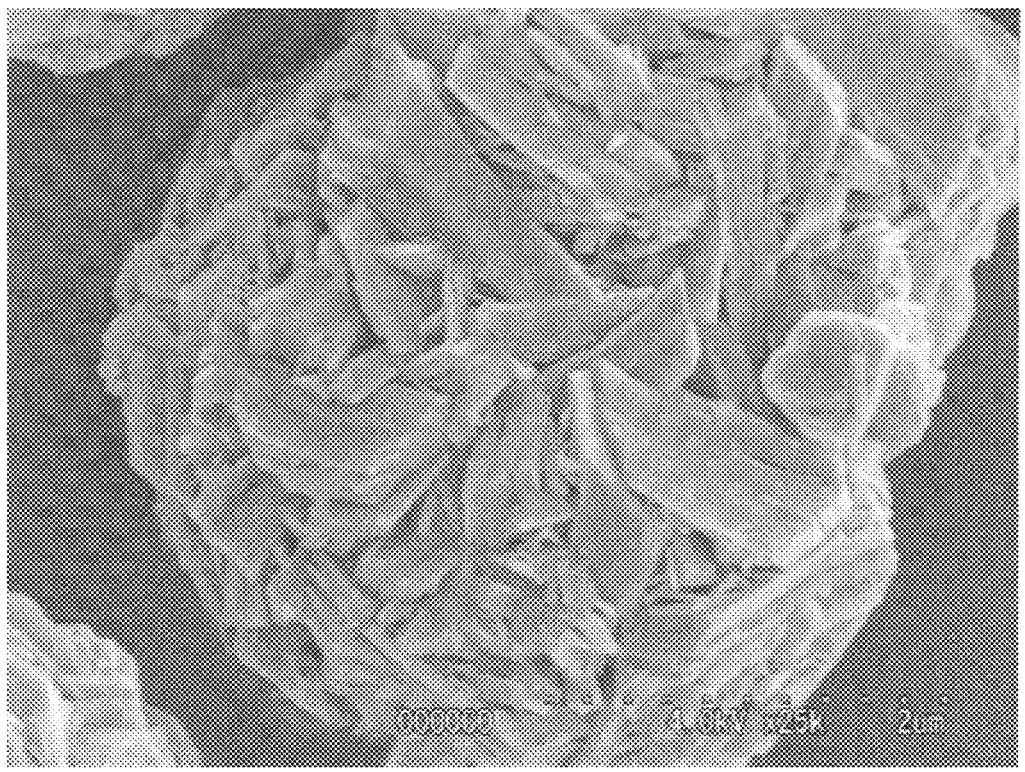
FIG. 16 is an electron micrograph (SEM) of the nickel-cobalt-manganese-based compound particles obtained in Example 6 (magnification: ×25000 times).
Figure 17:
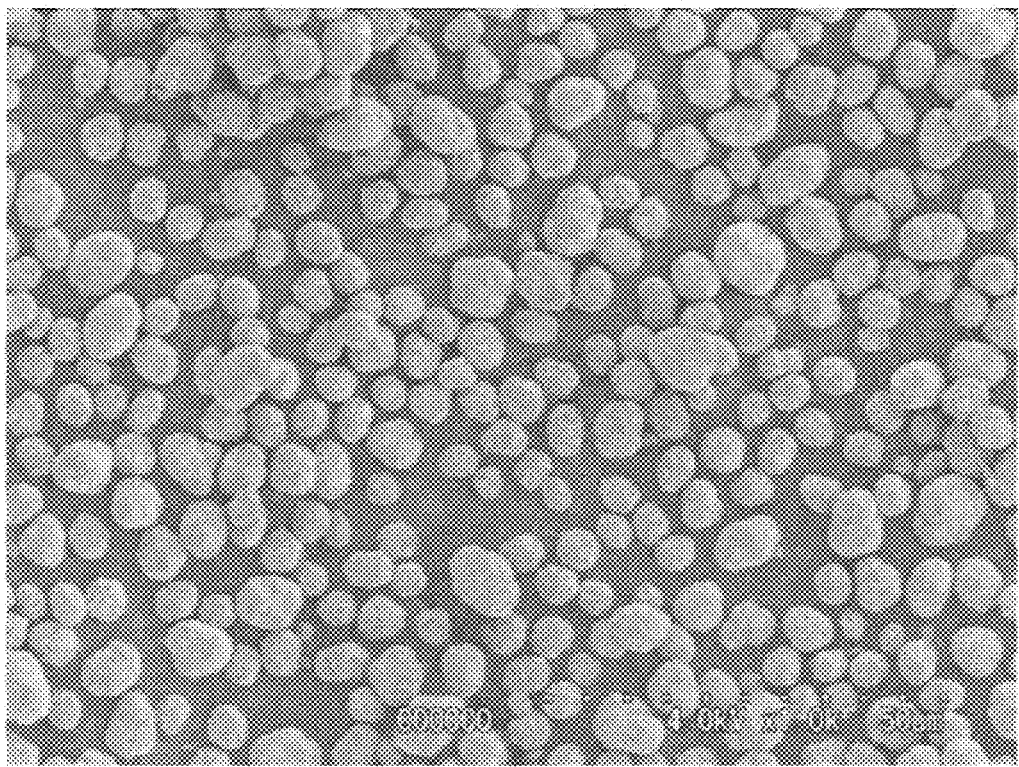
FIG. 17 is an electron micrograph (SEM) of the nickel-cobalt-manganese-based compound particles obtained in Example 7 (magnification: ×1000 times).
Figure 18:
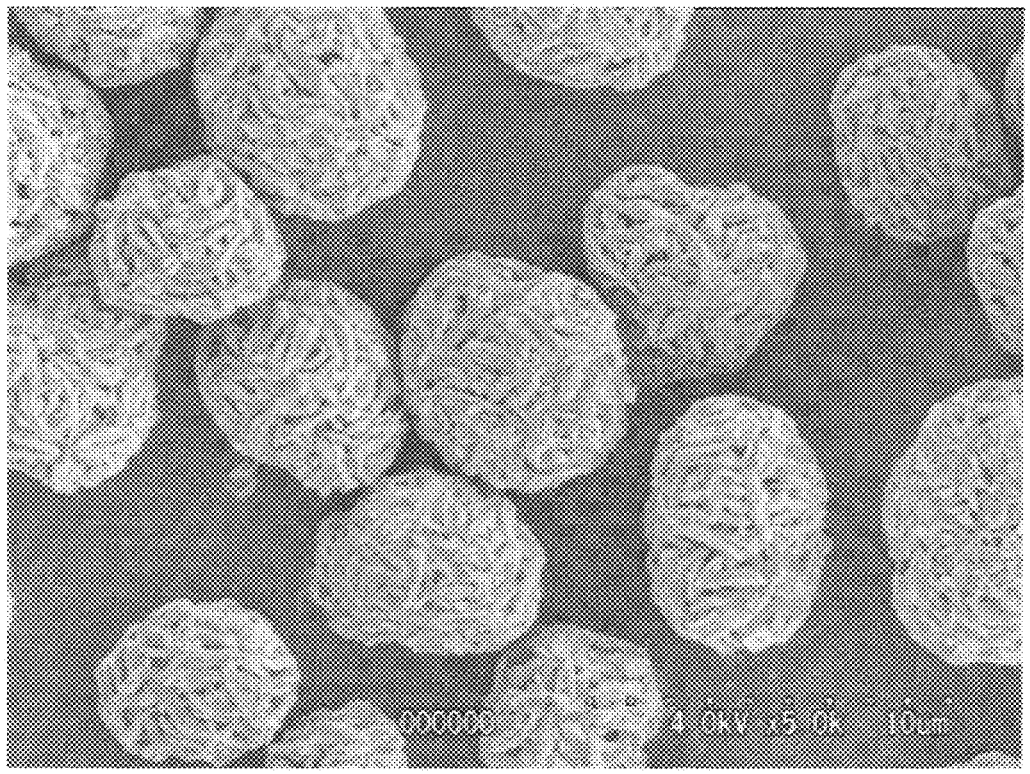
FIG. 18 is an electron micrograph (SEM) of the nickel-cobalt-manganese-based compound particles obtained in Example 7 (magnification: ×5000 times).
Figure 19:
FIG. 19 is an electron micrograph (SEM) of the nickel-cobalt-manganese-based compound particles obtained in Example 7 (magnification: ×25000 times).
Figure 20:
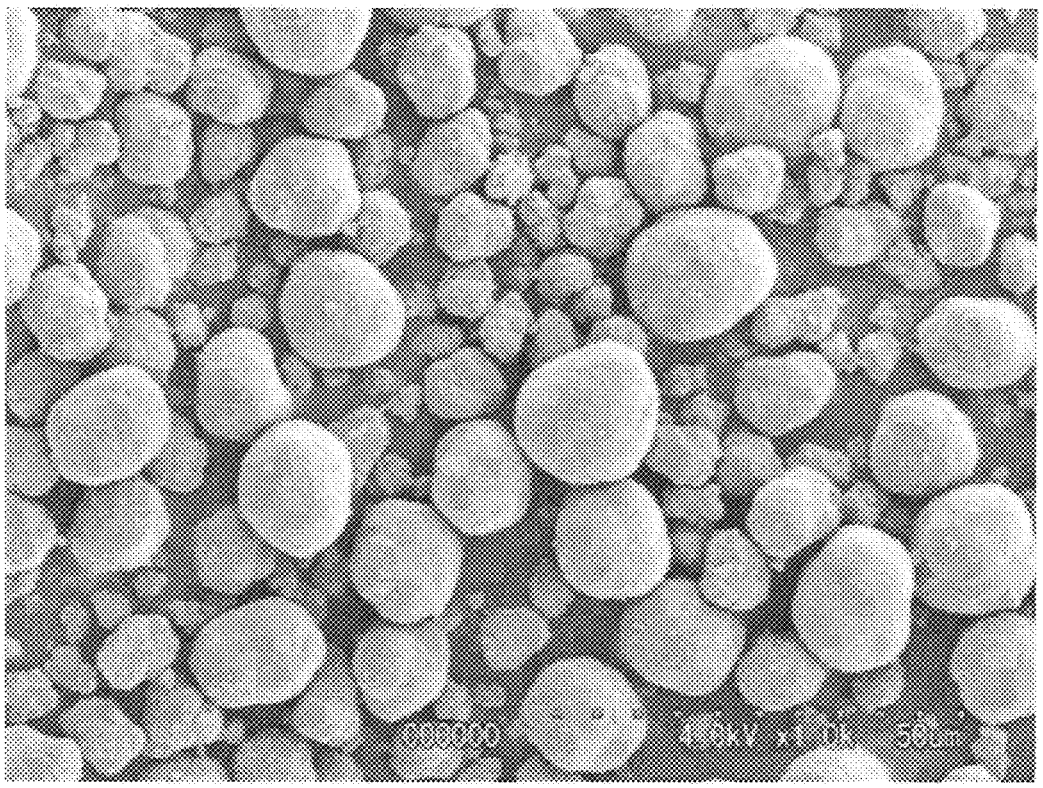
FIG. 20 is an electron micrograph (SEM) of the nickel-cobalt-manganese-based compound particles obtained in Comparative Example 1 (magnification: ×1000 times).
Figure 21:
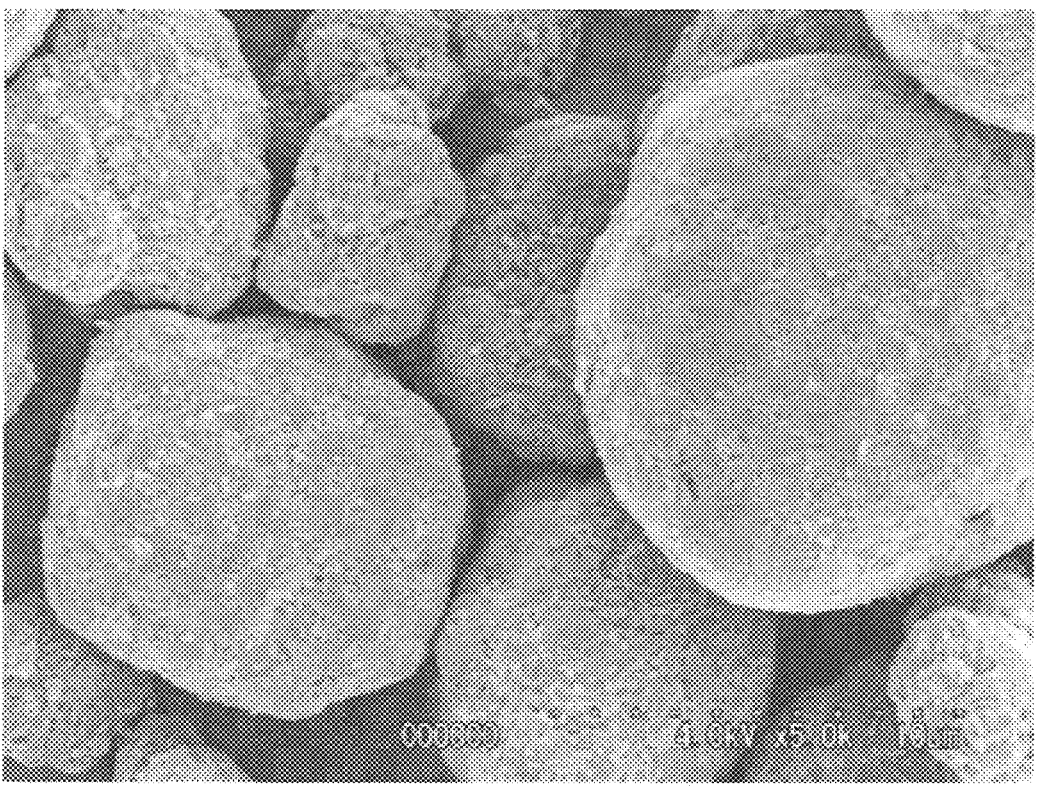
FIG. 21 is an electron micrograph (SEM) of the nickel-cobalt-manganese-based compound particles obtained in Comparative Example 1 (magnification: ×5000 times).
Figure 22:
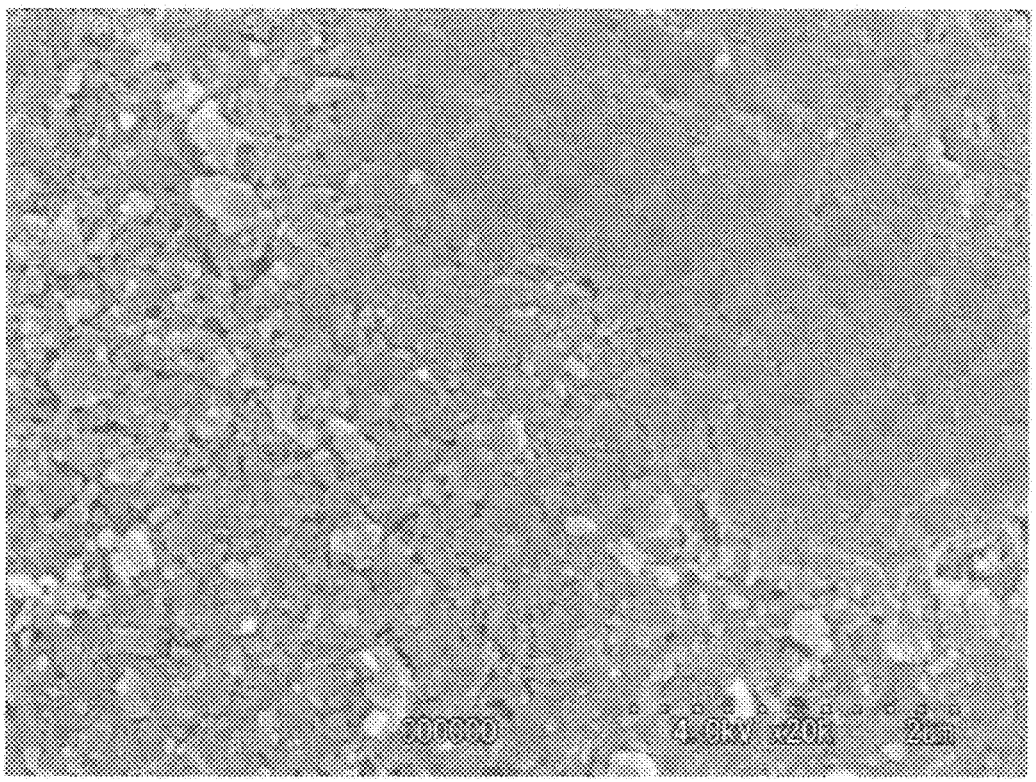
FIG. 22 is an electron micrograph (SEM) of the nickel-cobalt-manganese-based compound particles obtained in Comparative Example 1 (magnification: ×20000 times).
Figure 23:
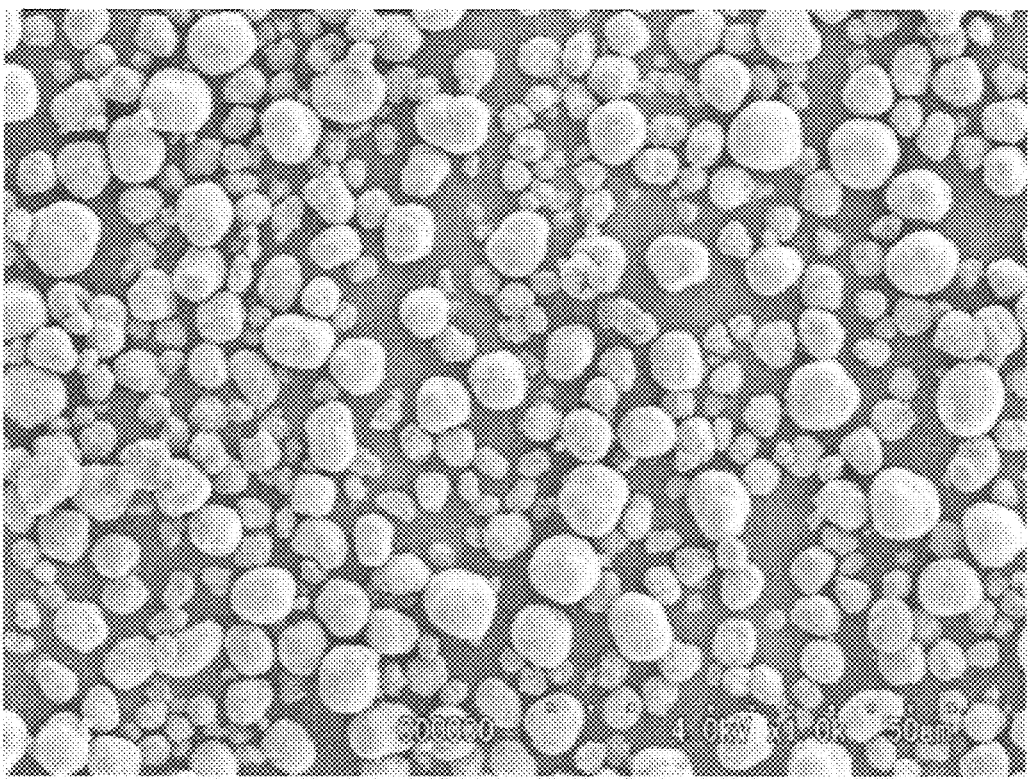
FIG. 23 is an electron micrograph (SEM) of the nickel-cobalt-manganese-based compound particles obtained in Comparative Example 2 (magnification: ×1000 times).
Figure 24:
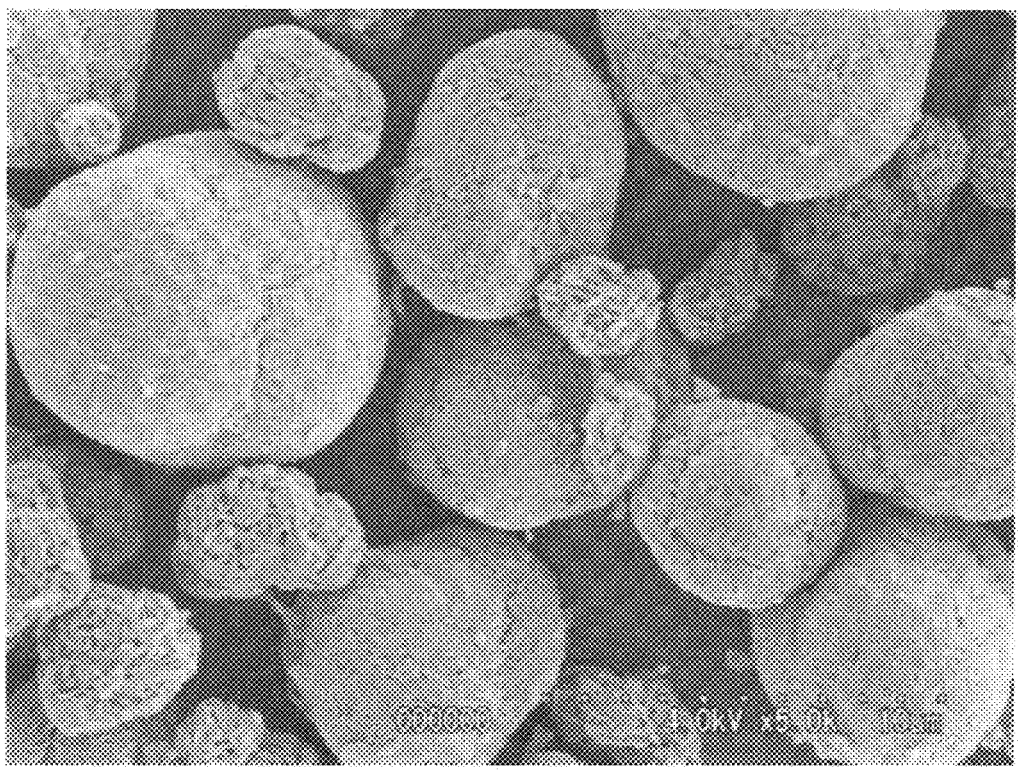
FIG. 24 is an electron micrograph (SEM) of the nickel-cobalt-manganese-based compound particles obtained in Comparative Example 2 (magnification: ×5000 times).
Figure 25:
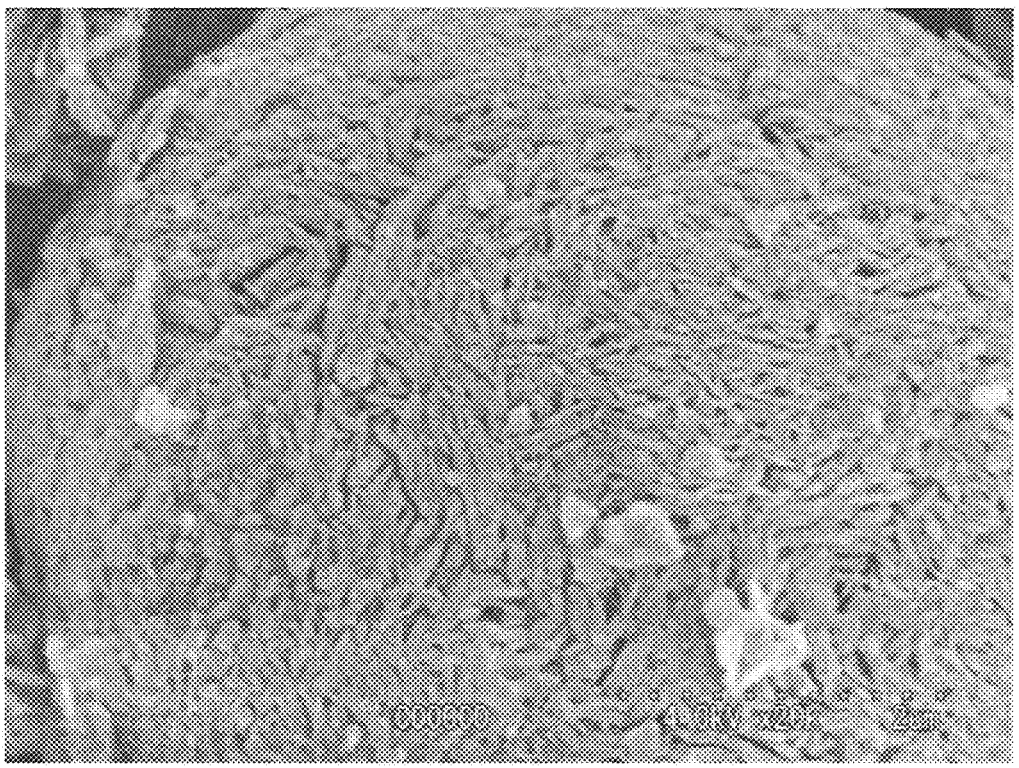
FIG. 25 is an electron micrograph (SEM) of the nickel-cobalt-manganese-based compound particles obtained in Comparative Example 2 (magnification: ×20000 times).
Figure 26:
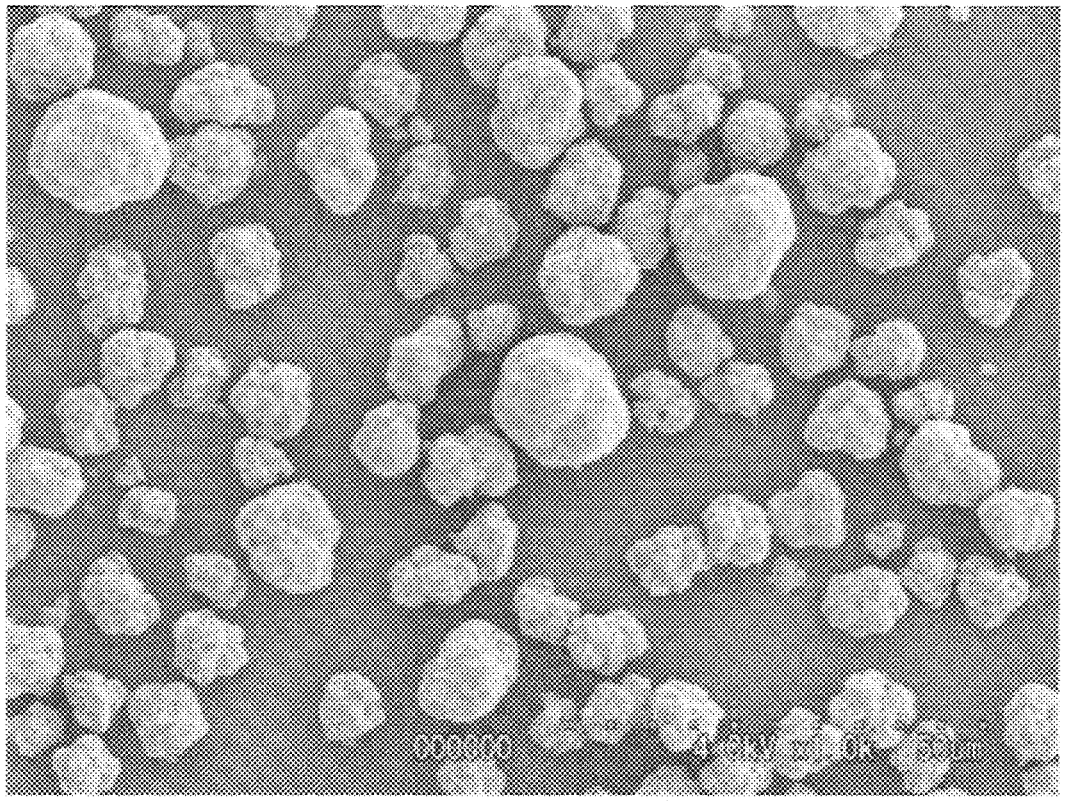
FIG. 26 is an electron micrograph (SEM) of the nickel-cobalt-manganese-based compound particles obtained in Comparative Example 3 (magnification: ×1000 times).
Figure 27:
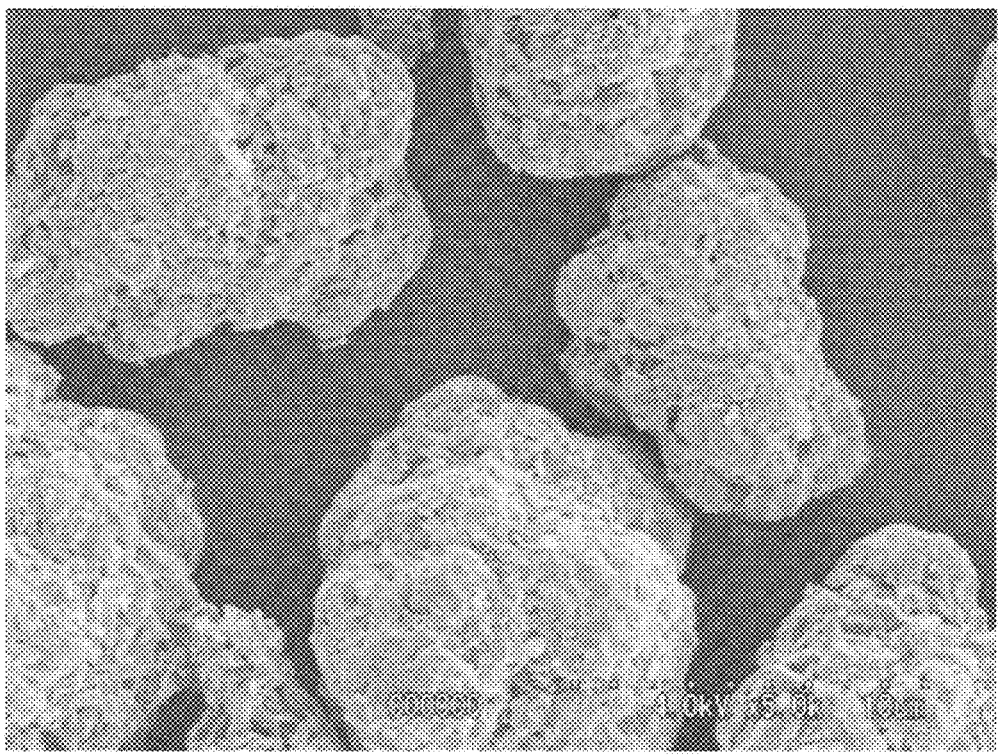
FIG. 27 is an electron micrograph (SEM) of the nickel-cobalt-manganese-based compound particles obtained in Comparative Example 3 (magnification: ×5000 times).
Figure 28:
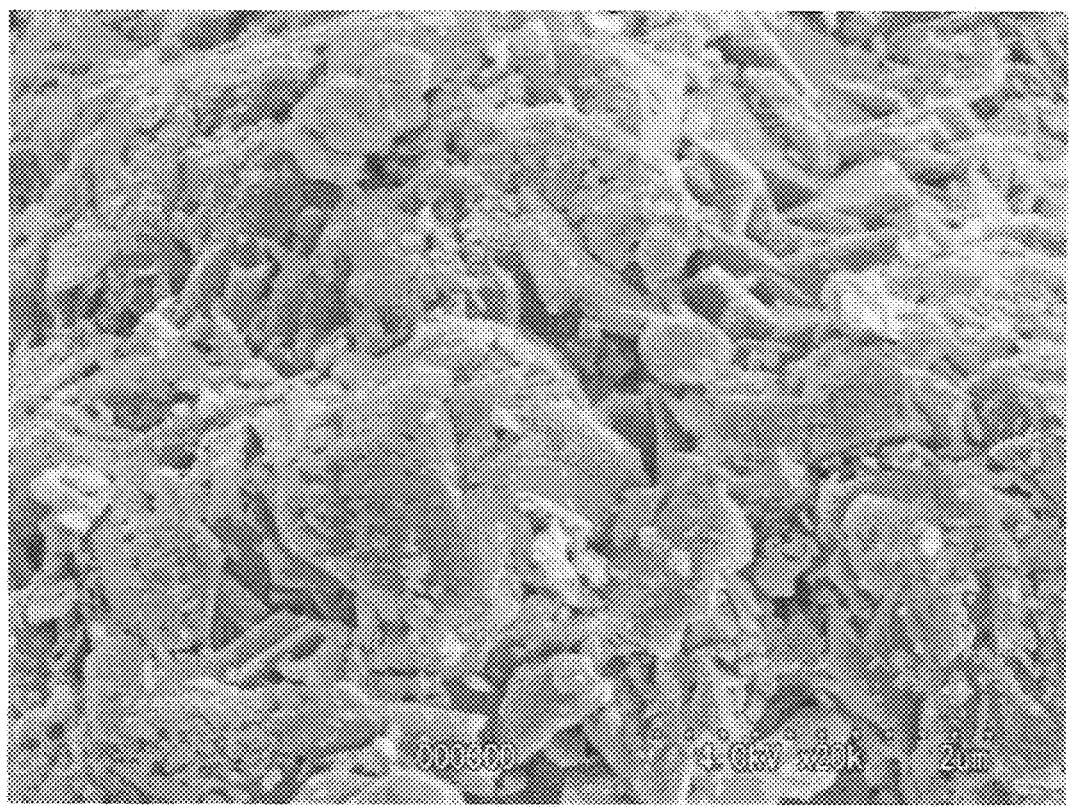
FIG. 28 is an electron micrograph (SEM) of the nickel-cobalt-manganese-based compound particles obtained in Comparative Example 3 (magnification: ×20000 times).
Figure 31:
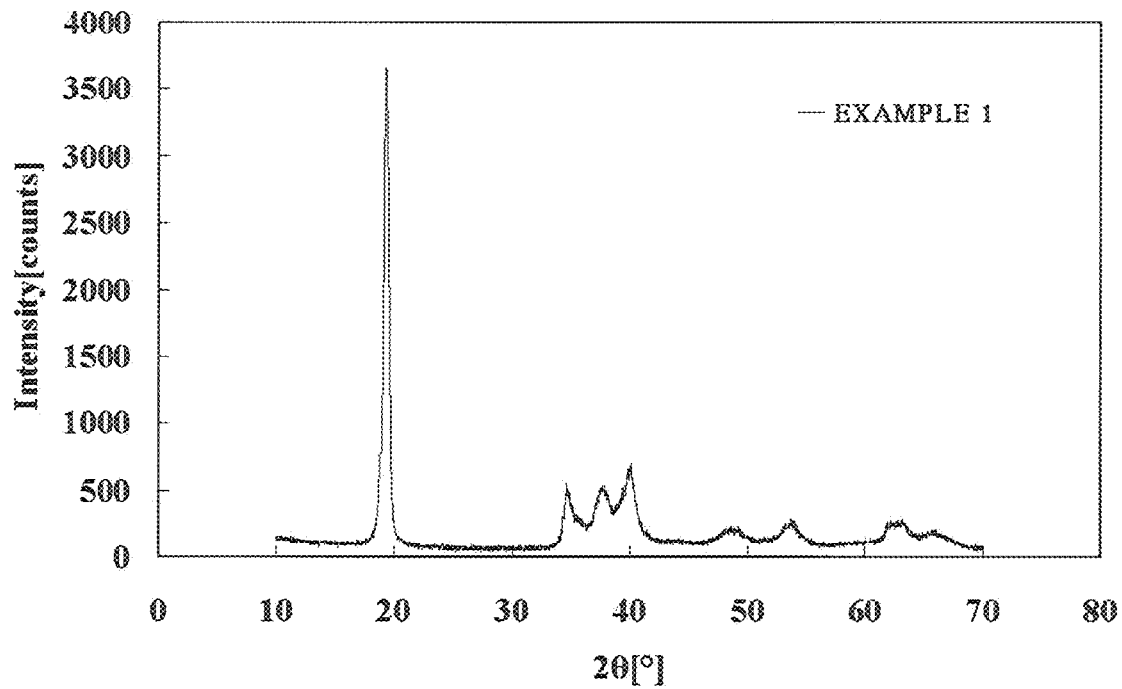
FIG. 31 is an XRD profile of the nickel-cobalt-manganese-based compound particles obtained in Example 1.

After completion of the reaction, the resulting suspension was withdrawn from the reactor and washed with water using a filter press, and then the obtained filter cake was dried at 150° C. for 12 hr, thereby obtaining nickel-cobalt-manganese-based compound particles (nickel-cobalt-manganese composite hydroxide particles). As a result, it was confirmed that the thus obtained nickel-cobalt-manganese-based compound particles had D50 of 11.8 μm, a volume-based peak half value width of 4.4 μm, a specific surface area BET of 6.9 m$^2$/g, a tap density of 2.25 g/cm$^3$ and a crystallite size of 285 Å. The XRD profile of the resulting nickel-cobalt-manganese-based compound particles is shown in FIG. 31, whereas the SEM micrographs thereof are shown in FIG. 2 (magnification: ×1000 times), FIG. 3 (magnification: ×5000 times) and FIG. 4 (magnification: ×25000 times).

Examples 2 to 8

The same procedure as defined in Example 1 was conducted except that the composition, reaction temperature, pH and reaction concentrations were variously changed, thereby obtaining nickel-cobalt-manganese-based compound particles.

The production conditions used above are shown in Table 1, and various properties of the thus obtained nickel-cobalt-manganese-based compound particles are shown in Table 2.

Comparative Examples 1 to 3

Various kinds of nickel-cobalt-manganese-based compound particles which were different in their composition from each other were produced according to the methods described in Examples of Japanese Patent Application Laid-Open (Tokuhyo) No. 2009-515799. Various properties of the thus obtained nickel-cobalt-manganese-based compound particles are shown in Table 2.

As a result, it was confirmed that the production method described in Japanese Patent Application Laid-Open (Tokuhyo) No. 2009-515799 was a continuous reaction method, and therefore the resulting particles suffered from generation of very fine particles and had a wide particle size distribution.

TABLE 1

| | Composition as aimed (Ni:Co:Mn) | Reaction temperature (° C.) | pH | Reaction concentration (mol/L) |
|---|---|---|---|---|
| Example 1 | 5:2:3 | 40 | 12.0 | 4.0 |
| Example 2 | 5:2:3 | 50 | 12.0 | 2.0 |
| Example 3 | 5:2:3 | 40 | 11.8 | 4.0 |
| Example 4 | 5:2:3 | 60 | 12.0 | 15.0 |
| Example 5 | 1:1:1 | 40 | 12.0 | 12.0 |
| Example 6 | 5:3:2 | 40 | 11.2 | 6.0 |
| Example 7 | 3:4:3 | 30 | 11.4 | 5.6 |
| Example 8 | 3:4:3 | 40 | 12.0 | 3.6 |

TABLE 2

| | Properties of nickel-cobalt-manganese-based compound particles | | |
|---|---|---|---|
| | Ni (mol %) | Co (mol %) | Mn (mol %) |
| Example 1 | 48.55 | 20.75 | 30.70 |
| Example 2 | 49.40 | 20.50 | 30.20 |
| Example 3 | 49.30 | 20.30 | 30.40 |
| Example 4 | 49.30 | 20.20 | 30.50 |
| Example 5 | 32.94 | 33.42 | 33.64 |
| Example 6 | 49.70 | 30.50 | 19.80 |
| Example 7 | 29.20 | 41.20 | 29.70 |
| Example 8 | 29.30 | 41.00 | 29.70 |
| Comp. Example 1 | 49.90 | 20.62 | 29.48 |
| Comp. Example 2 | 32.97 | 33.94 | 33.10 |
| Comp. Example 3 | 33.23 | 33.33 | 33.44 |

TABLE 2-continued

Properties of nickel-cobalt-manganese-based compound particles

|  | D50 (μm) | half value width of peak (μm) | D50 × 0.4 (μm) |
|---|---|---|---|
| Example 1 | 11.8 | 4.4 | 4.7 |
| Example 2 | 8.9 | 3.5 | 3.6 |
| Example 3 | 6.8 | 2.6 | 2.7 |
| Example 4 | 15.0 | 5.8 | 6.0 |
| Example 5 | 11.0 | 3.7 | 4.4 |
| Example 6 | 4.2 | 1.4 | 1.7 |
| Example 7 | 5.7 | 2.2 | 2.3 |
| Example 8 | 7.1 | 2.6 | 2.8 |
| Comp. Example 1 | 11.4 | 7.8 | 4.6 |
| Comp. Example 2 | 6.7 | 3.1 | 2.7 |
| Comp. Example 3 | 9.2 | 4.2 | 3.7 |

Properties of nickel-cobalt-manganese-based compound particles

|  | BET specific surface area ($m^2/g$) | Tap density ($g/cm^3$) | Crystallite size (Å) |
|---|---|---|---|
| Example 1 | 6.9 | 2.25 | 285 |
| Example 2 | 7.4 | 2.33 | 325 |
| Example 3 | 5.4 | 2.20 | 210 |
| Example 4 | 4.8 | 2.40 | 290 |
| Example 5 | 16.0 | 2.23 | 249 |
| Example 6 | 8.3 | 2.11 | 158 |
| Example 7 | 17.2 | 2.06 | 271 |
| Example 8 | 14.2 | 2.21 | 310 |
| Comp. Example 1 | 7.9 | 2.05 | 242 |
| Comp. Example 2 | 8.3 | 1.98 | 271 |
| Comp. Example 3 | 12.0 | 1.86 | 252 |

The SEM micrographs of the particles obtained in Examples 2 to 8 are shown in FIG. 5 to FIG. 19.

The SEM micrographs of the particles obtained in Comparative Examples 1 to 3 are shown in FIG. 20 to FIG. 28.

Figure 29:
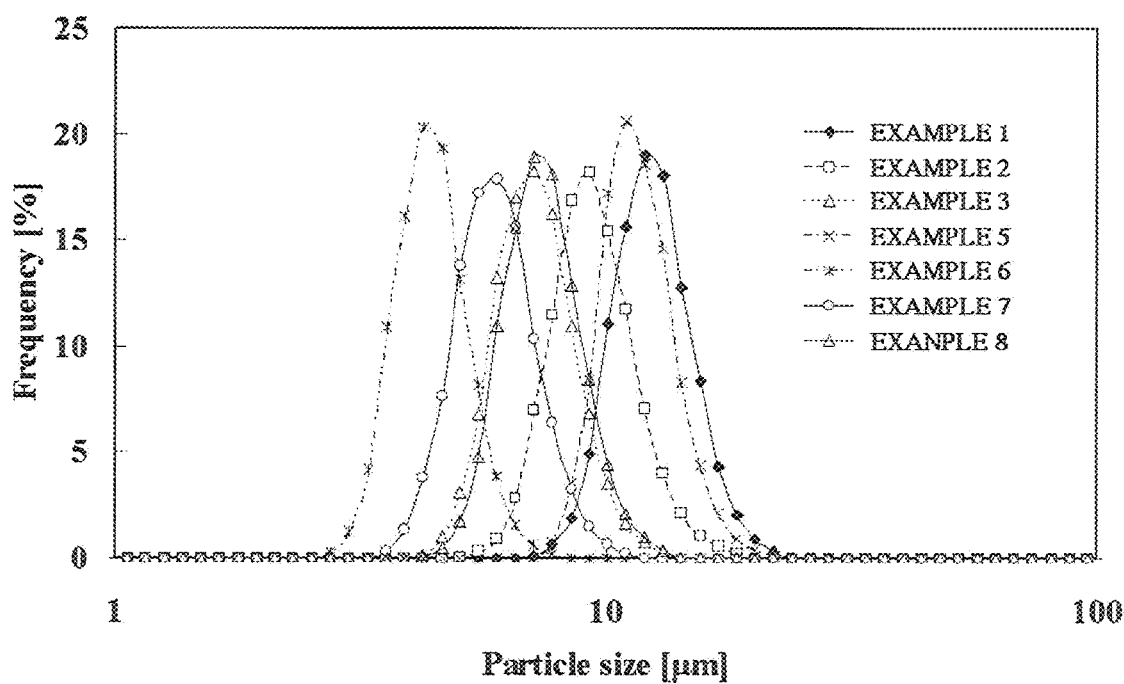
FIG. 29 is a view showing particle size distributions of the nickel-cobalt-manganese-based compound particles obtained in Examples 1 to 8, respectively.
Figure 30:
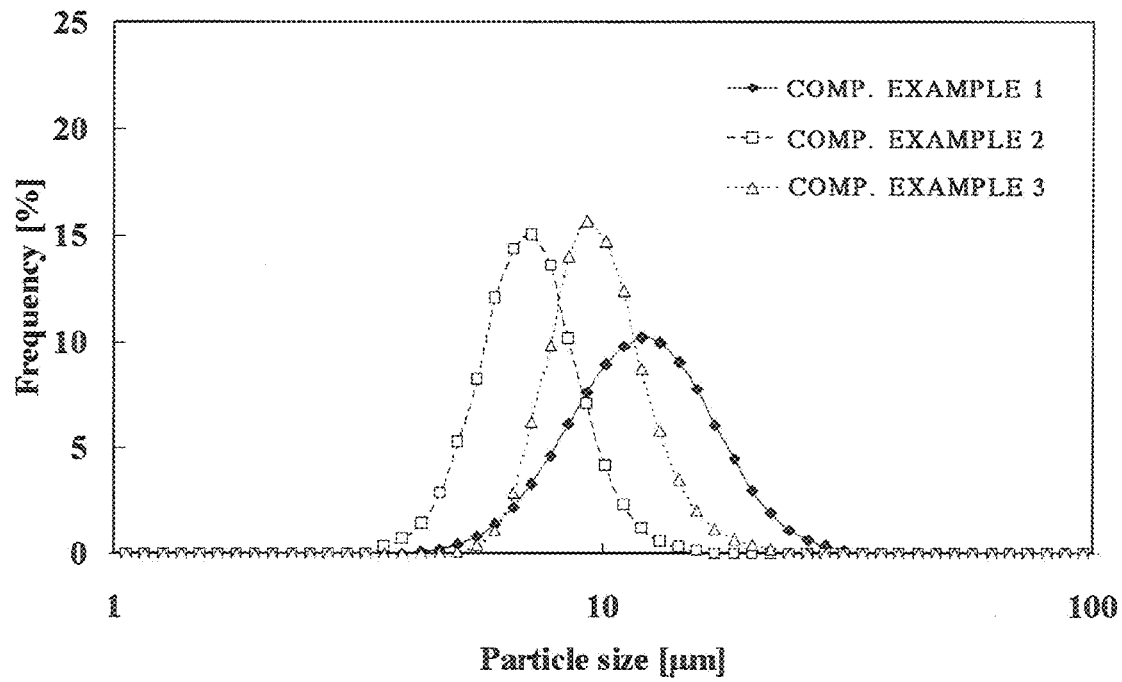
FIG. 30 is a view showing particle size distributions of the nickel-cobalt-manganese-based compound particles obtained in Comparative Examples 1 to 3, respectively.

The particle size distributions of the particles obtained in Examples 1 to 8 are shown in FIG. 29, whereas the particle size distributions of the particles obtained in Comparative Examples 1 to 3 are shown in FIG. 30.

The XRD profile of the particles obtained in Example 1 is shown in FIG. 31.

Example 9

Production of Positive Electrode Active Substance

The nickel-cobalt-manganese-based compound particles obtained in Example 1 and a lithium compound were intimately mixed with each other in such an amount that the molar ratio of lithium/(cobalt+nickel+manganese) was 1.05, and the resulting mixed particles were calcined in an atmospheric air at 950° C. for 10 hr, thereby obtaining lithium composite oxide particles.

As a result, it was confirmed that the thus obtained lithium composite oxide particles had such a composition that the molar ratio (mol %) of Ni:Co:Mn therein was 48.85:20.29:30.86, and the molar ratio of Li to a total amount of nickel, cobalt and manganese [lithium/(nickel+cobalt+manganese)] was 1.05. Also, as a result of subjecting the thus obtained lithium composite oxide particles to X-ray diffraction analysis, it was confirmed that the obtained particles were constituted from only a layered lithium compound single phase without any impurity phase. Further, it was confirmed that the lithium composite oxide particles had an average particle diameter of 11.6 μm, a volume-based peak half value width of 4.4 μm and a BET specific surface area of 0.31 $m^2/g$, and therefore were in the form of particles having a uniform particle size.

Further, the coin cell produced by using the above positive electrode active substance had an initial discharge capacity of 165.7 mAh/g, an initial efficiency of 86.0%, a rate characteristic (as measured at 1 C/0.1 C) of 89.7% and a capacity retention rate at the 200th cycle of 87.3% as measured at room temperature and 66.2% as measured at 60° C.

Comparative Example 4

Production of Positive Electrode Active Substance

The nickel-cobalt-manganese-based compound particles obtained in Comparative Example 1 and a lithium compound were intimately mixed with each other in such an amount that the molar ratio of lithium/whole metals was 1.05, and the resulting mixed particles were calcined in an atmospheric air at 950° C. for 10 hr, thereby obtaining lithium composite oxide particles.

As a result, it was confirmed that the thus obtained lithium composite oxide particles had such a composition that the molar ratio (mol %) of Ni:Co:Mn therein was 50.38:20.77:28.85, and the molar ratio of Li to a total amount of nickel, cobalt and manganese [lithium/(nickel+cobalt+manganese)] was 1.05. Also, as a result of subjecting the thus obtained lithium composite oxide particles to X-ray diffraction analysis, it was confirmed that the obtained particles were constituted from only a layered lithium compound single phase without any impurity phase. Further, it was confirmed that the lithium composite oxide particles had an average particle diameter of 10.8 μm, a volume-based peak half value width of 6.9 μm and a BET specific surface area of 0.38 $m^2/g$.

Further, the coin cell produced by using the above positive electrode active substance had an initial discharge capacity of 158.2 mAh/g, an initial efficiency of 82.6%, a rate characteristic (as measured at 1 C/0.1 C) of 84.9% and a capacity retention rate at the 200th cycle of 80.0% as measured at room temperature and 60.1% as measured at 60° C.

The production conditions used above, various properties of the thus obtained lithium composite oxide particles and battery characteristics are shown in Tables 3 and 4.

Examples 10 to 16 and Comparative Examples 5 and 6

The same procedure as defined in Example 9 was conducted except that the kind of nickel-cobalt-manganese-based compound particles used, the molar ratio of lithium/(cobalt+nickel+manganese) and the calcination temperature were variously changed, thereby obtaining lithium composite oxide particles.

The production conditions used above, various properties of the thus obtained lithium composite oxide particles and battery characteristics are shown in Table 3.

TABLE 3

| | Production conditions | | |
|---|---|---|---|
| | Precursor used | Li/Me | Calcination temperature (° C.) |
| Example 9 | Example 1 | 1.05 | 950 |
| Example 10 | Example 2 | 1.02 | 970 |
| Example 11 | Example 3 | 1.02 | 950 |
| Example 12 | Example 4 | 1.02 | 970 |

TABLE 3-continued

| | | | |
|---|---|---|---|
| Example 13 | Example 5 | 1.05 | 950 |
| Example 14 | Example 6 | 0.98 | 910 |
| Example 15 | Example 7 | 0.98 | 950 |
| Example 16 | Example 8 | 1.15 | 950 |
| Comp. Example 4 | Comp. Example 1 | 1.05 | 950 |
| Comp. Example 5 | Comp. Example 2 | 1.05 | 950 |
| Comp. Example 6 | Comp. Example 3 | 1.05 | 950 |

| | Properties of lithium composite oxide particles | | | |
|---|---|---|---|---|
| | Li/Me (Ni + Co + Mn) | Ni (mol %) | Co (mol %) | Mn (mol %) |
| Example 9 | 1.05 | 48.85 | 20.29 | 30.86 |
| Example 10 | 1.02 | 48.72 | 20.28 | 31.00 |
| Example 11 | 1.02 | 49.50 | 19.96 | 30.54 |
| Example 12 | 1.01 | 49.13 | 20.04 | 30.83 |
| Example 13 | 1.04 | 32.88 | 33.07 | 34.05 |
| Example 14 | 0.98 | 49.69 | 30.40 | 19.91 |
| Example 15 | 0.97 | 29.28 | 41.23 | 29.49 |
| Example 16 | 1.14 | 29.39 | 40.98 | 29.63 |
| Comp. Example 4 | 1.05 | 50.38 | 20.77 | 28.85 |
| Comp. Example 5 | 1.04 | 33.37 | 33.82 | 32.81 |
| Comp. Example 6 | 1.04 | 33.22 | 33.31 | 33.47 |

| | Properties of lithium composite oxide particles | | | |
|---|---|---|---|---|
| | D50 (μm) | Half value width of peak (μm) | 0.4 × D50 | BET ($m^2/g$) |
| Example 9 | 11.6 | 4.4 | 4.7 | 0.31 |
| Example 10 | 9.3 | 3.1 | 3.7 | 0.31 |
| Example 11 | 5.9 | 1.9 | 2.4 | 0.53 |
| Example 12 | 13.5 | 4.6 | 5.4 | 0.33 |
| Example 13 | 10.1 | 3.6 | 4.0 | 0.45 |
| Example 14 | 4.4 | 1.4 | 1.8 | 0.60 |
| Example 15 | 4.1 | 1.3 | 1.6 | 0.99 |
| Example 16 | 8.8 | 3.0 | 3.5 | 0.30 |
| Comp. Example 4 | 10.8 | 6.9 | 4.3 | 0.38 |
| Comp. Example 5 | 6.0 | 2.6 | 2.4 | 0.50 |
| Comp. Example 6 | 9.9 | 4.5 | 4.0 | 0.45 |

| | Battery properties | | |
|---|---|---|---|
| | Initial capacity (mAh/g) | Initial efficiency (%) | Rate (1 C/0.1 C) |
| Example 9 | 165.7 | 86.0 | 89.7 |
| Example 10 | 167.4 | 88.1 | 88.2 |
| Example 11 | 170.7 | 89.4 | 90.1 |
| Example 12 | 168.1 | 84.8 | 89.9 |
| Example 13 | 161.8 | 89.7 | 90.1 |
| Example 14 | 169.6 | 90.4 | 88.3 |
| Example 15 | 151.0 | 90.6 | 91.8 |
| Example 16 | 149.3 | 90.4 | 91.3 |
| Comp. Example 4 | 158.2 | 82.6 | 84.9 |
| Comp. Example 5 | 156.2 | 88.0 | 84.7 |
| Comp. Example 6 | 155.0 | 87.0 | 86.8 |

TABLE 4

| | Battery characteristics | |
|---|---|---|
| | Capacity retention rate of 200th cycle at room temperature (%) | Capacity retention rate of 200th cycle at high temperature (%) |
| Example 9 | 87.3 | 66.2 |
| Comp. Example 4 | 80.0 | 60.1 |

As a result, it was confirmed that the lithium composite oxide particles obtained in Examples were more excellent in initial capacity, initial efficiency and rate characteristic than those of the lithium composite oxide particles obtained in Comparative Examples. In particular, from the comparison between the lithium composite oxide particles having substantially the same compositions, for example, from the comparison between Examples 9 to 12 and Comparative Example 4, it was apparently recognized that the lithium composite oxide particles obtained in Examples 9 to 12 have more excellent properties than those obtained in Comparative Example 4.

Figure 32:
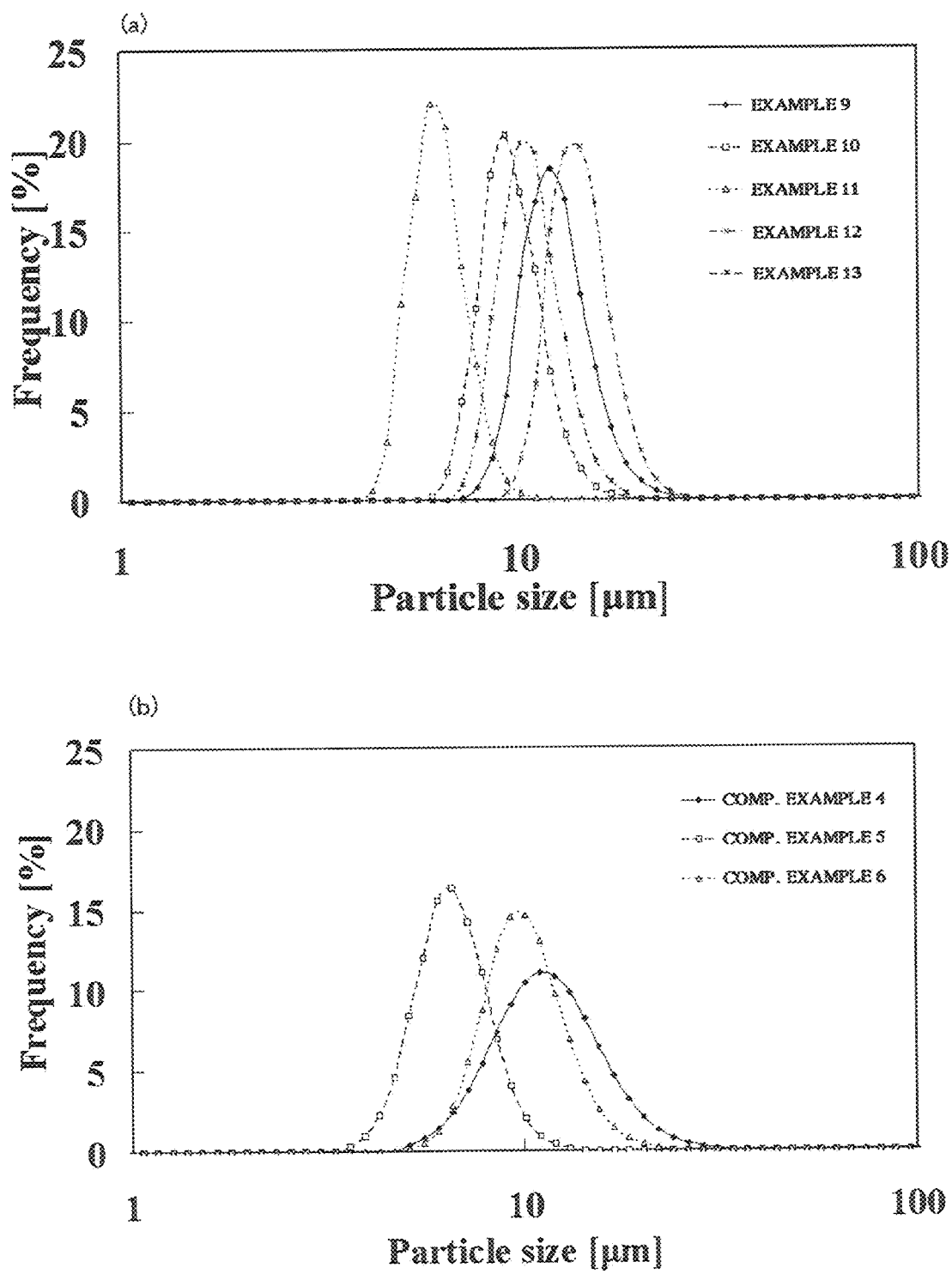
FIG. 32 is a view showing particle size distributions of the lithium composite oxide particles obtained in Examples 9 to 13 and Comparative Examples 4 to 6, respectively.
Figure 33:
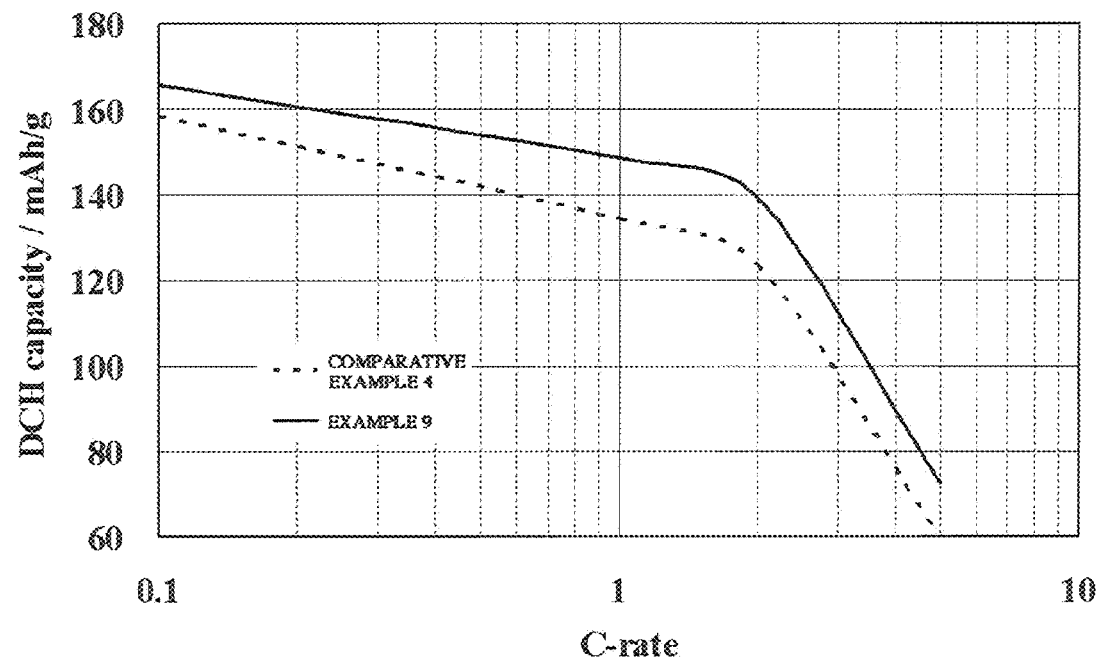
FIG. 33 is a view showing a rate characteristic of respective batteries produced using the lithium composite oxide particles obtained in Example 9 and Comparative Example 4.
Figure 34:
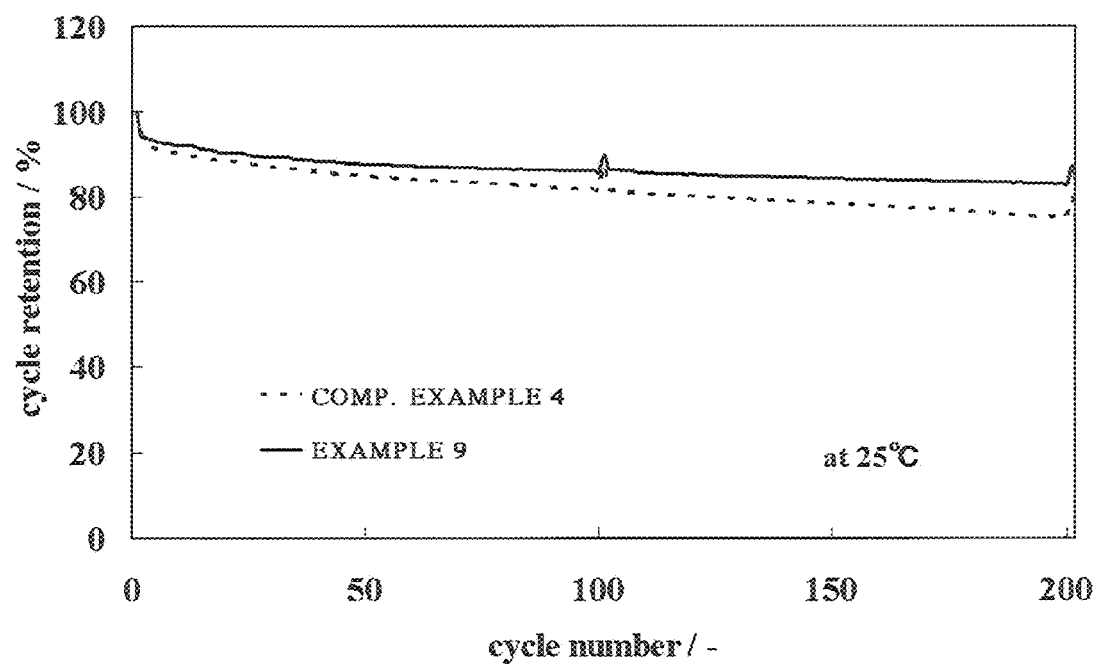
FIG. 34 is a view showing cycle characteristics as measured at room temperature of 25° C. of respective batteries produced using the lithium composite oxide particles obtained in Example 9 and Comparative Example 4.
Figure 35:
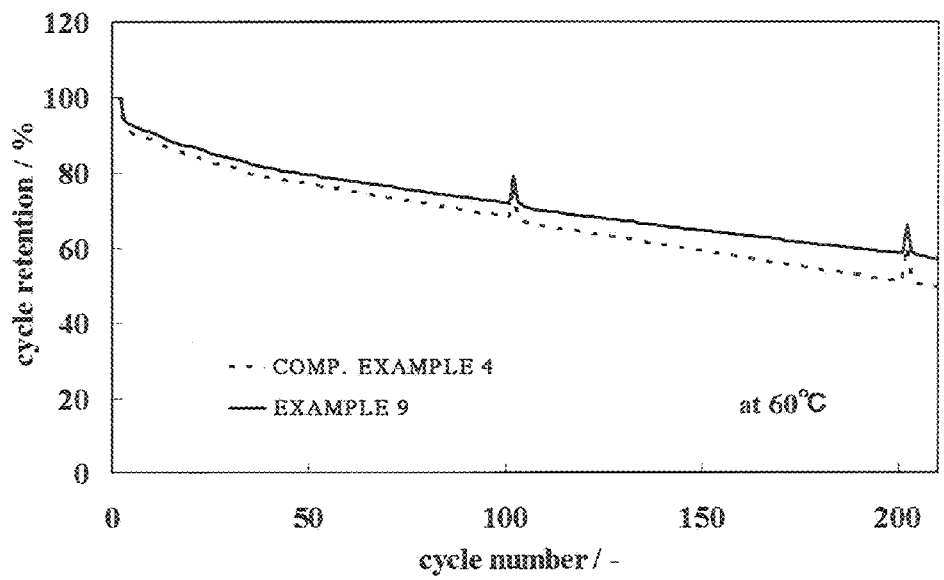
FIG. 35 is a view showing cycle characteristics as measured at a high temperature of 60° C. of respective batteries produced using the lithium composite oxide particles obtained in Example 9 and Comparative Example 4.

The particle size distributions of the lithium composite oxide particles obtained in Example 9 and Comparative Example 4 are shown in FIG. 32; the rate characteristics of respective batteries produced using the lithium composite oxide particles obtained in Example 9 and Comparative Example 4 are shown in FIG. 33; the cycle characteristics of the lithium composite oxide particles as measured at room temperature are shown in FIG. 34; and the cycle characteristics of the lithium composite oxide particles as measured at a high temperature of 60° C. are shown in FIG. 35.

As a result, it was confirmed that the lithium composite oxide particles obtained in Examples were more excellent in capacity retention rate at room temperature and at a high temperature than those obtained in Comparative Examples.

Figure 36:
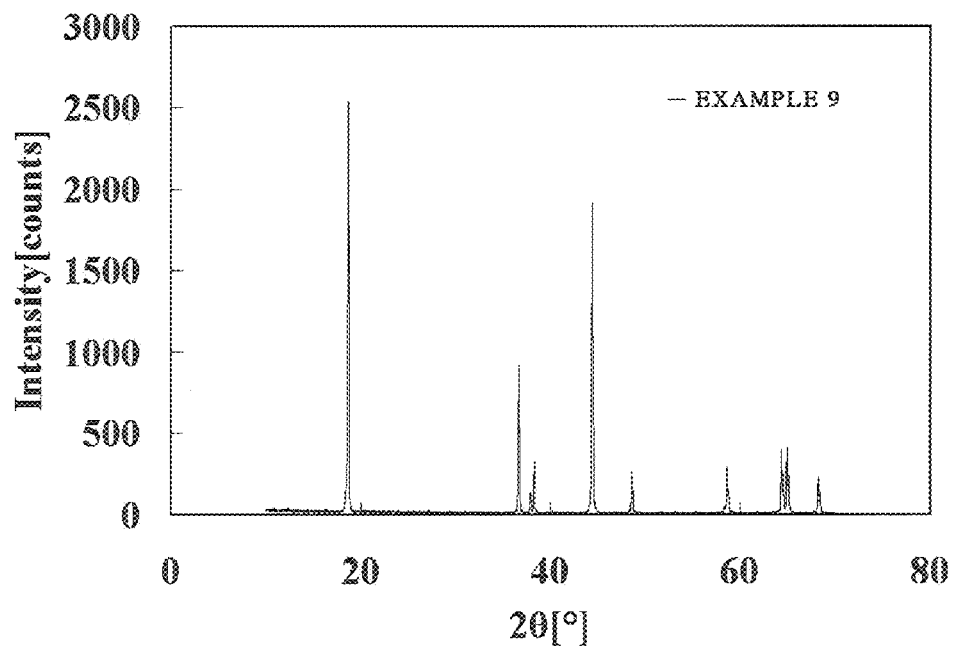
FIG. 36 is an XRD profile of the lithium composite oxide particles obtained in Example 9.
Figure 37:
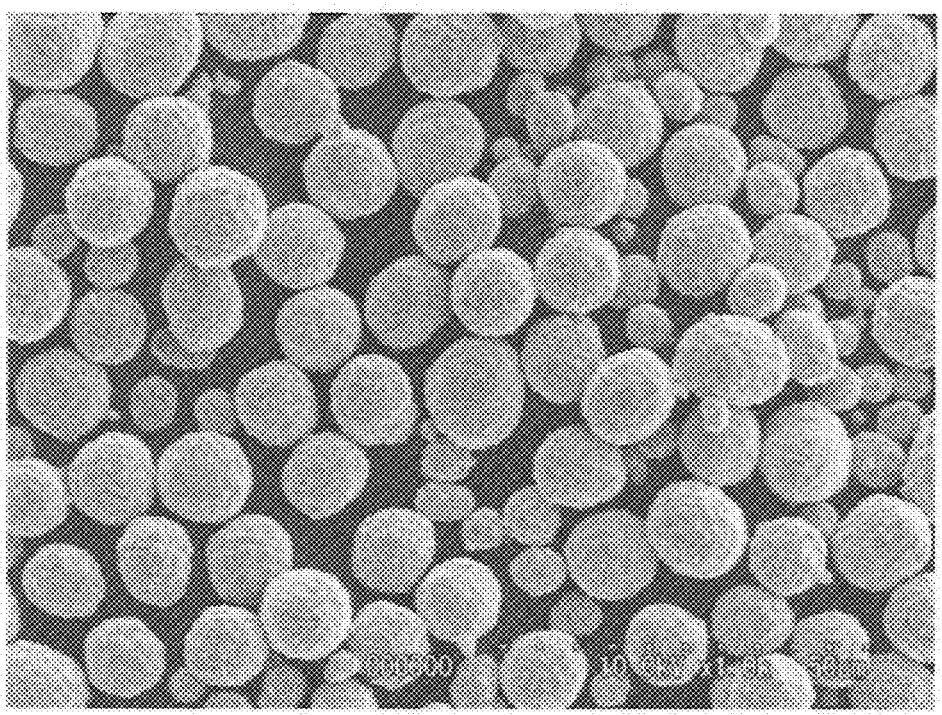
FIG. 37 is an electron micrograph (SEM) of the lithium composite oxide particles obtained in Example 9 (magnification: ×1000 times).
Figure 38:
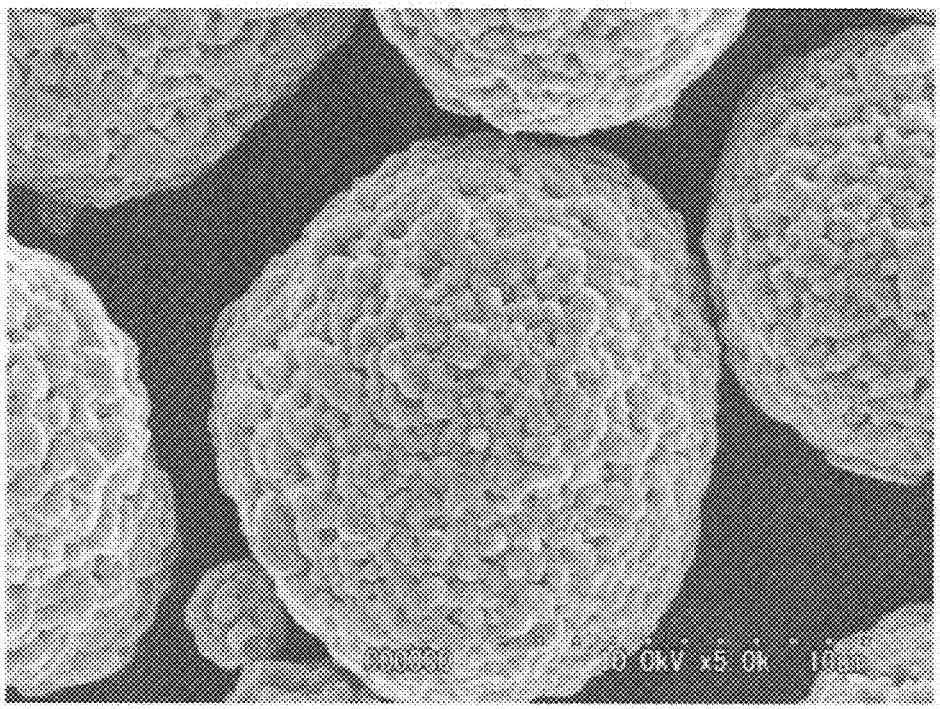
FIG. 38 is an electron micrograph (SEM) of the lithium composite oxide particles obtained in Example 9 (magnification: ×5000 times).
Figure 39:
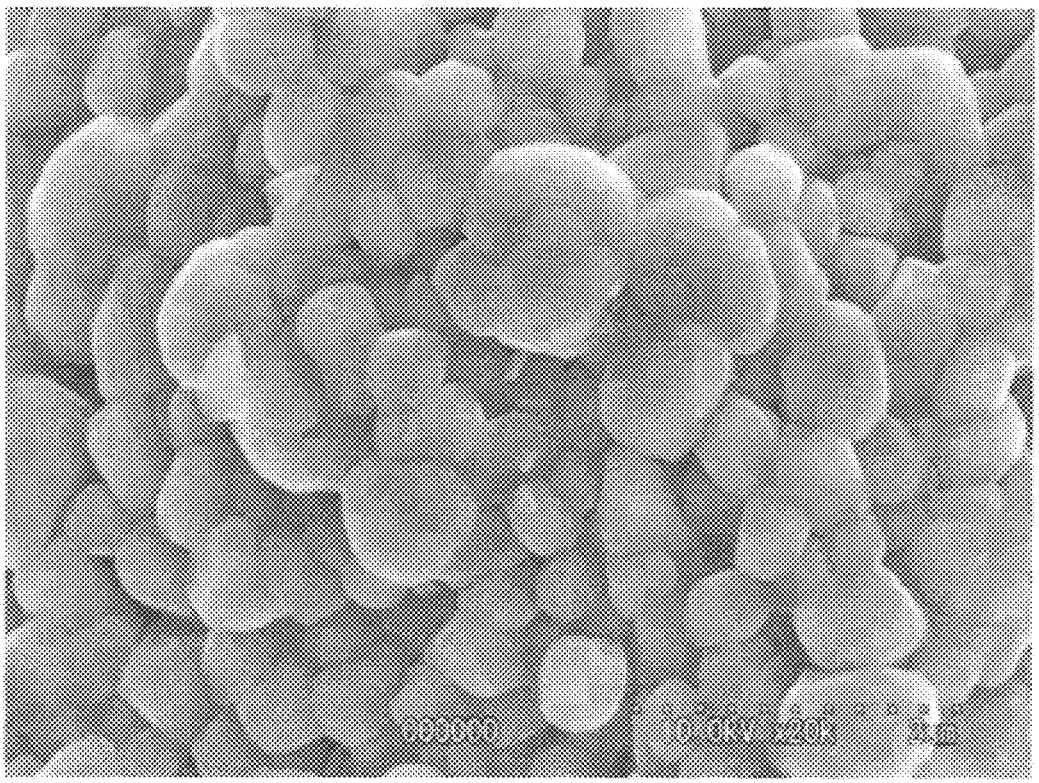
FIG. 39 is an electron micrograph (SEM) of the lithium composite oxide particles obtained in Example 9 (magnification: ×20000 times).
Figure 40:
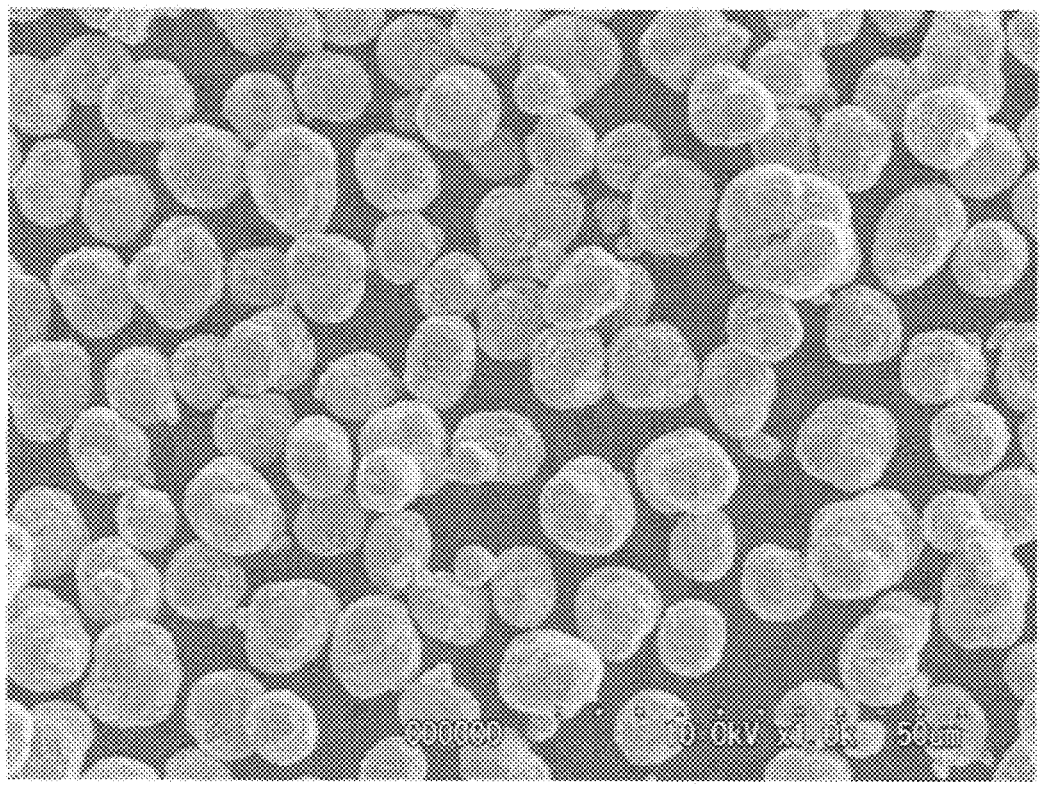
FIG. 40 is an electron micrograph (SEM) of the lithium composite oxide particles obtained in Example 13 (magnification: ×1000 times).
Figure 41:
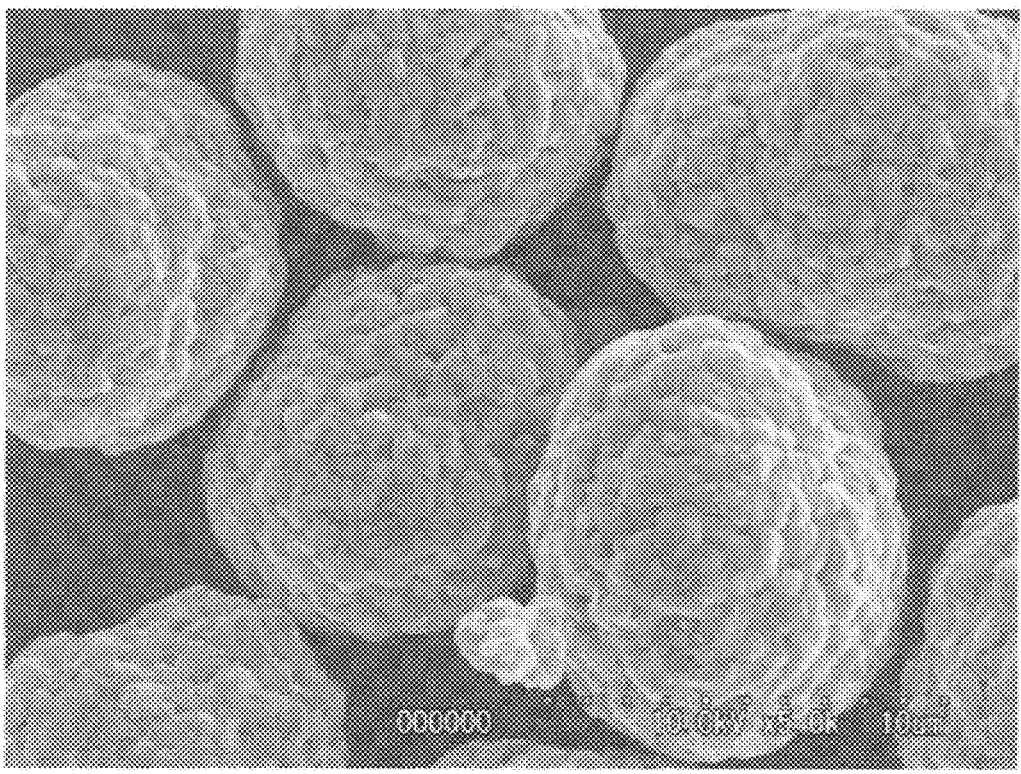
FIG. 41 is an electron micrograph (SEM) of the lithium composite oxide particles obtained in Example 13 (magnification: ×5000 times).
Figure 42:
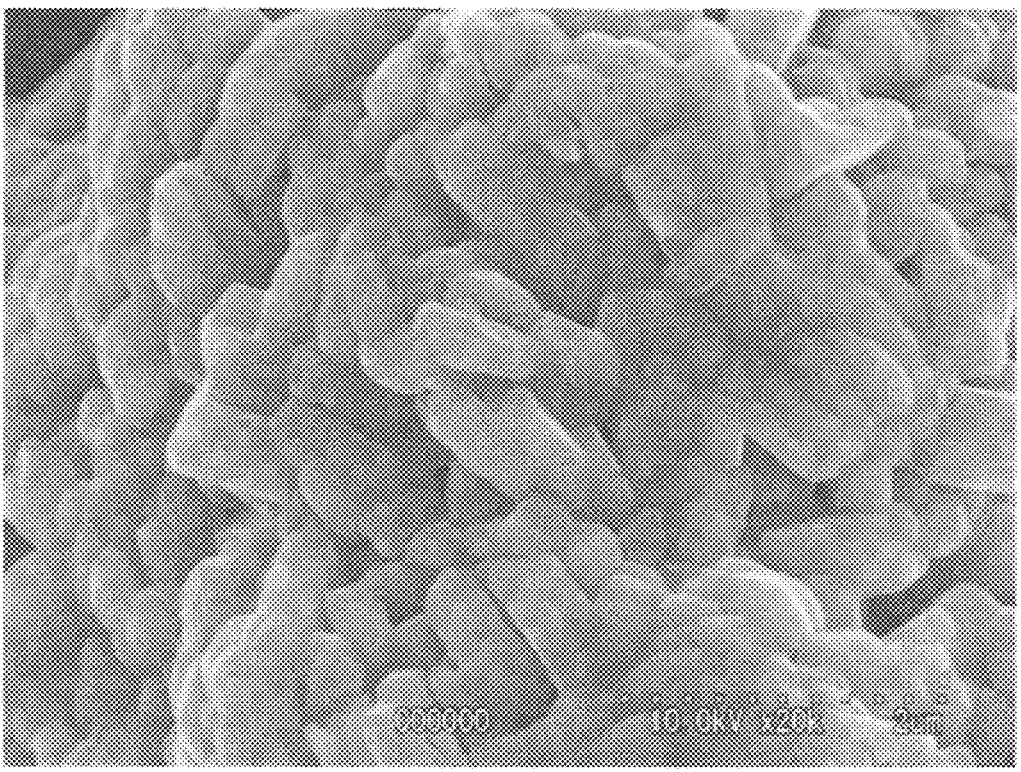
FIG. 42 is an electron micrograph (SEM) of the lithium composite oxide particles obtained in Example 13 (magnification: ×20000 times).
Figure 43:
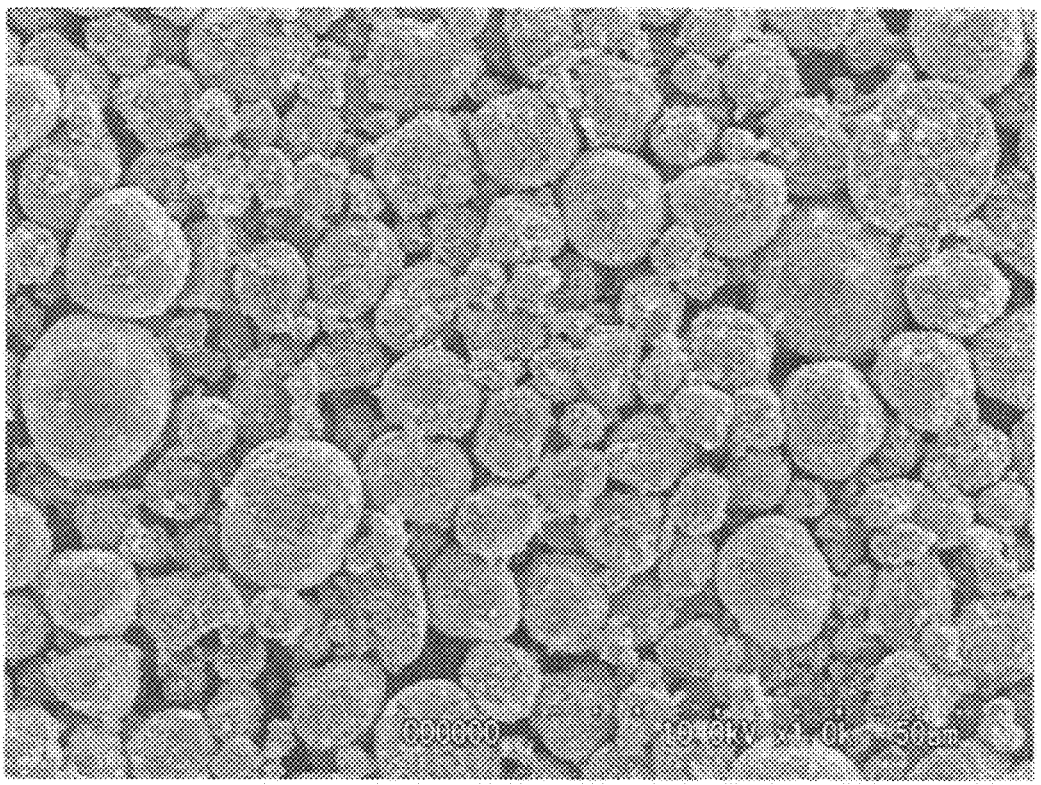
FIG. 43 is an electron micrograph (SEM) of the lithium composite oxide particles obtained in Comparative Example 4 (magnification: ×1000 times).
Figure 44:
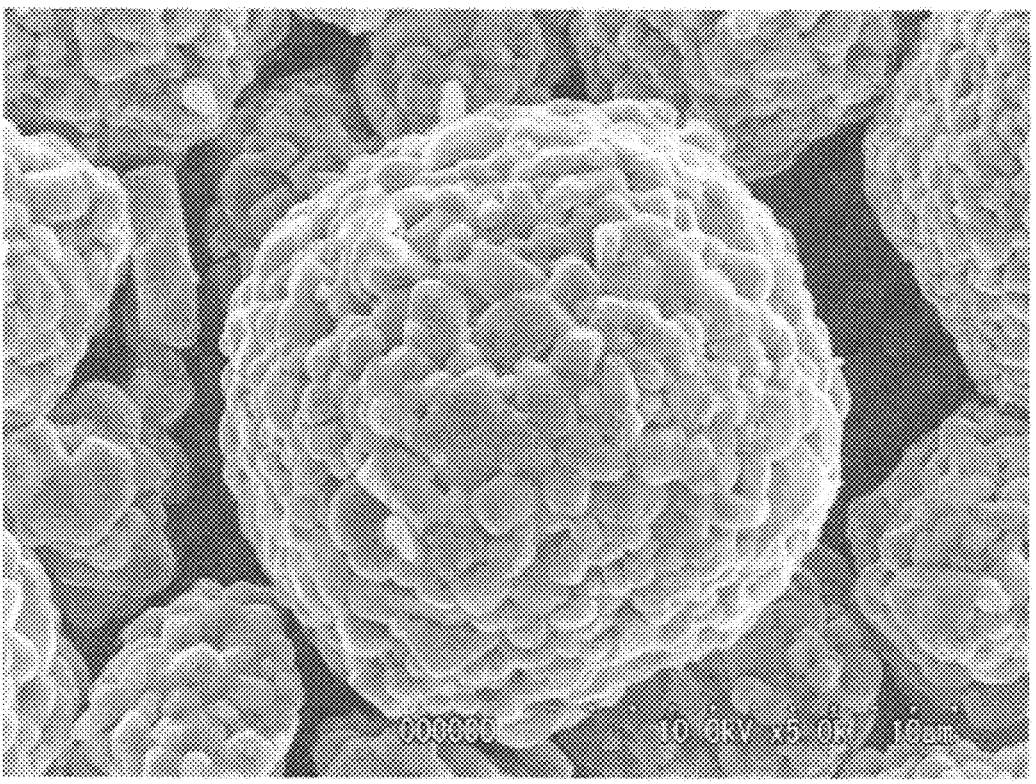
FIG. 44 is an electron micrograph (SEM) of the lithium composite oxide particles obtained in Comparative Example 4 (magnification: ×5000 times).
Figure 45:
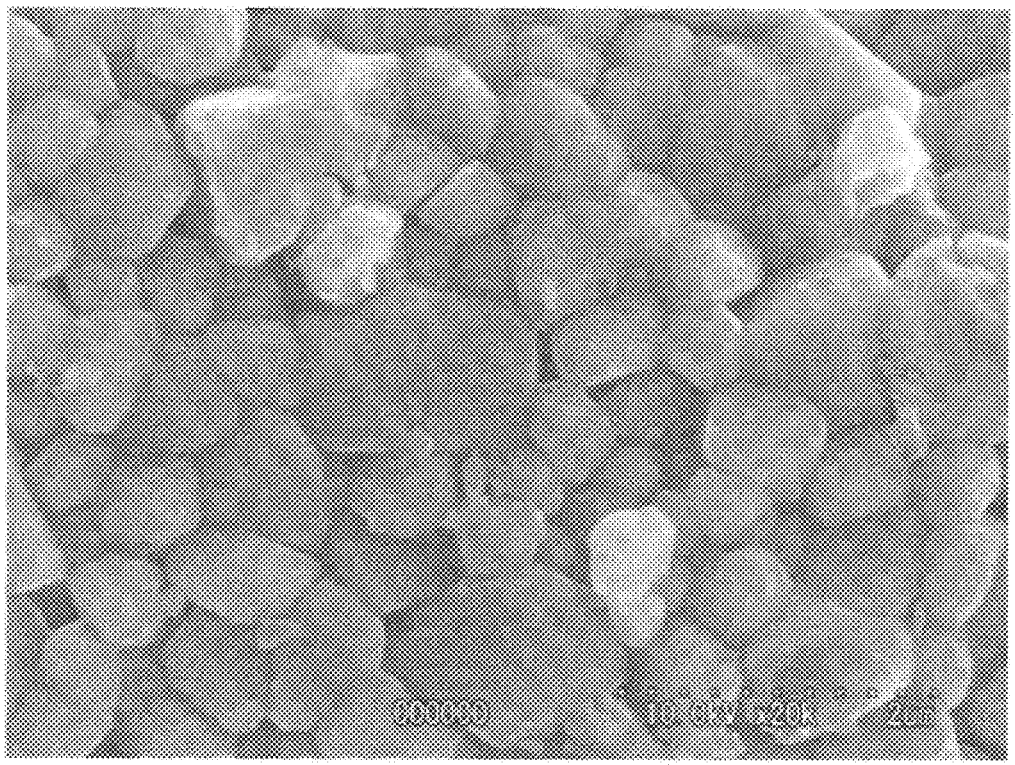
FIG. 45 is an electron micrograph (SEM) of the lithium composite oxide particles obtained in Comparative Example 4 (magnification: ×20000 times).
Figure 46:
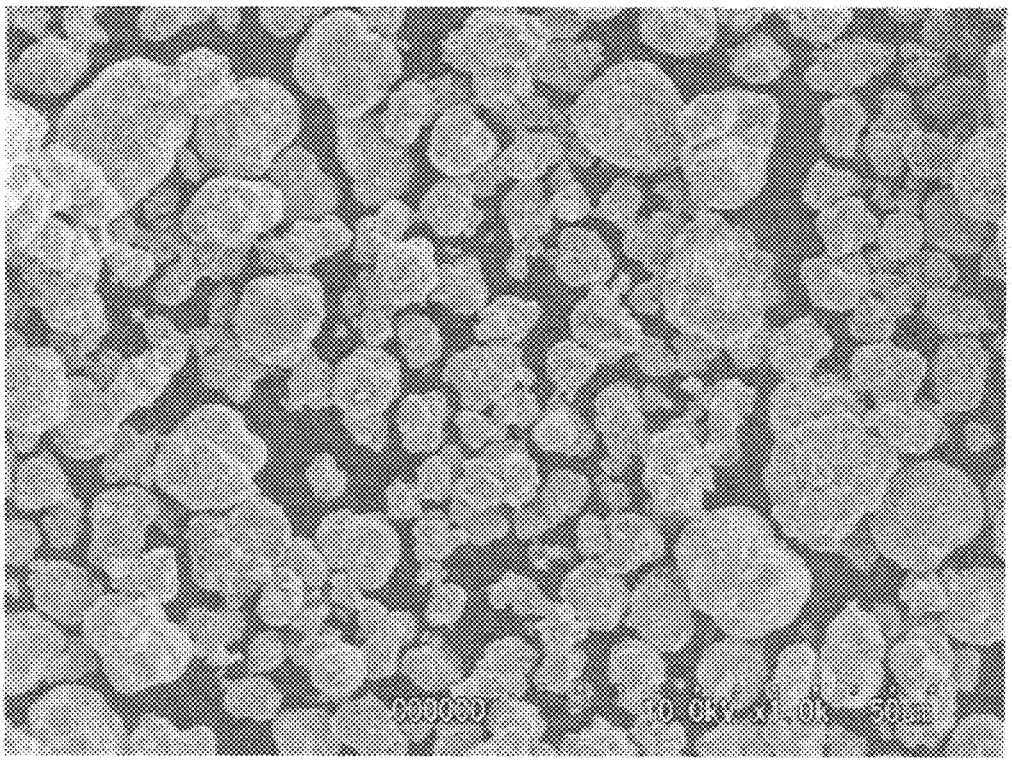
FIG. 46 is an electron micrograph (SEM) of the lithium composite oxide particles obtained in Comparative Example 6 (magnification: ×1000 times).
Figure 47:
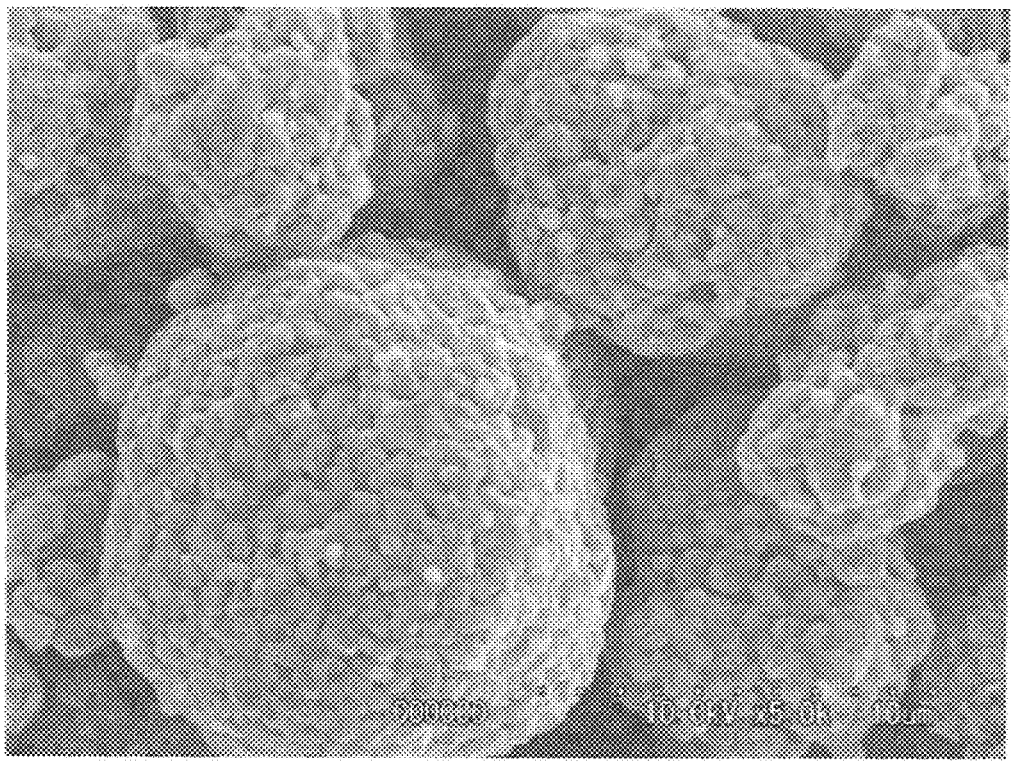
FIG. 47 is an electron micrograph (SEM) of the lithium composite oxide particles obtained in Comparative Example 6 (magnification: ×5000 times).
Figure 48:
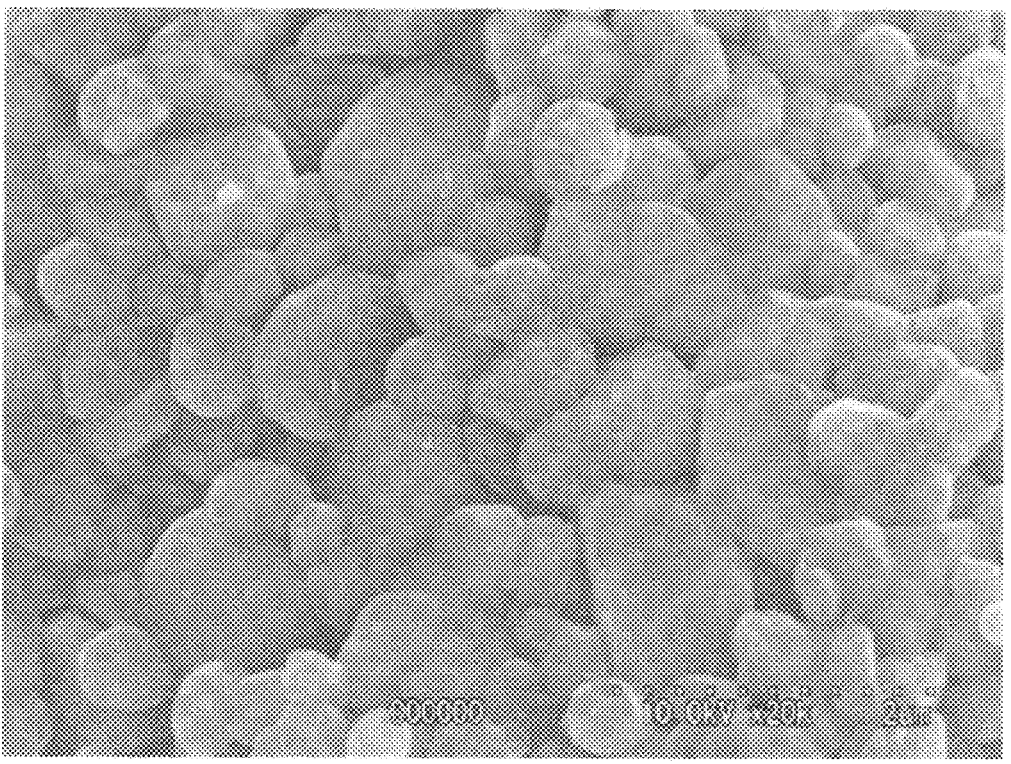
FIG. 48 is an electron micrograph (SEM) of the lithium composite oxide particles obtained in Comparative Example 6 (magnification: ×20000 times).

The XRD profile of the lithium composite oxide particles obtained in Example 9 is shown in FIG. 36.

In addition, the SEM micrographs of the lithium composite oxide particles obtained in Examples 9 and 13 and Comparative Examples 4 and 6 are respectively shown in FIG. 37 to FIG. 48.

It was also confirmed that the particle shape of the resulting lithium composite oxide particles was substantially the same as the particle shape of the nickel-cobalt-manganese-based compound particles as a precursor thereof.

INDUSTRIAL APPLICABILITY

When using the nickel-cobalt-manganese-based compound particles according to the present invention as a precursor of a positive electrode active substance, it is possible to obtain particles for the positive electrode active substance which have a relatively large primary particle diameter and a relatively small specific surface area without taking any measures for calcination conditions. In addition, when using the resulting positive electrode active substance for production of secondary batteries, it is possible to produce a non-aqueous secondary battery having a good thermal stability, a less occurrence of battery swelling, a high capacity, an excellent rate characteristic and good cycle characteristics at room temperature and at a high temperature.

EXPLANATION OF REFERENCE NUMERALS

1: Reactor; 2: Stirrer; 3: Draft tube; 4: Pump; 5: Concentrator; 6: Baffle; 10: Supply of raw materials; 11: Return line

The invention claimed is:

1. Nickel-cobalt-manganese-based compound particles having a volume-based average secondary particle diameter (D50) of 3.0 to 25.0 μm, in which the volume-based average secondary particle diameter (D50) and a half value width (W) of a peak in volume-based particle size distribution of secondary particles thereof satisfy the following relational formula 1:

$W \leq 0.4 \times D50.$ (Relational Formula 1)

2. Nickel-cobalt-manganese-based compound particles according to claim 1, wherein when a molar ratio (mol %) of Ni:Co:Mn in the particles is expressed by x:y:z, x is 5 to 65 mol %, y is 5 to 65 mol %, and z is 5 to 55 mol % with the proviso that a sum of x, y and z is 100 mol % (x+y+z=100 mol %).

3. A process for producing the nickel-cobalt-manganese-based compound particles as defined in claim 1, comprising the steps of:
   preparing a reaction apparatus comprising a reactor equipped with a stirrer and a draft tube and connected with a concentrator;
   previously introducing an alkali solution into the reactor; and continuously dropping a solution comprising metal salts comprising nickel, cobalt and manganese, and an alkali solution into the alkali solution previously introduced into the reactor from above a surface of the reaction solution to subject the resulting mixed solution to neutralization and precipitation reaction to thereby produce the nickel-cobalt-manganese-based compound particles,
   in which a part of a reaction slurry produced during the above reaction is withdrawn from a mid portion of the reactor and introduced into the concentrator, and the slurry concentrated in the concentrator is introduced again into the reactor such that a direction of the concentrated slurry introduced into the reactor is the same as a direction of a turning flow of the reaction slurry in the reactor to produce the nickel-cobalt-manganese-based compound particles, followed by subjecting the reaction slurry comprising the thus produced nickel-cobalt-manganese-based compound particles to filtration, washing with water and drying at a temperature of 150 to 250° C.

4. A process for producing the nickel-cobalt-manganese-based compound particles according to claim 3, wherein sodium hydroxide and ammonia are used as the alkali solution.

5. Lithium composite oxide particles comprising at least nickel, cobalt and manganese, and having a volume-based average secondary particle diameter (D50) of 3.0 to 25.0 μm, in which the volume-based average secondary particle diameter (D50) and a half value width (W) of a peak in volume-based particle size distribution of secondary particles thereof satisfy the following relational formula 2:

$$W \leq 0.4 \times D50. \quad \text{(Relational Formula 2)}$$

6. Lithium composite oxide particles according to claim 5, wherein when a molar ratio (mol %) of Ni:Co:Mn in the particles is expressed by x:y:z, x is 5 to 65 mol %, y is 5 to 65 mol %, and z is 5 to 55 mol % with the proviso that a sum of x, y and z is 100 mol % (x+y+z=100 mol %), and a molar ratio of Li to a total amount of nickel, cobalt and manganese [lithium/(nickel+cobalt+manganese)] is 0.90 to 1.20.

7. A process for producing lithium composite oxide particles, comprising the steps of:
   mixing the nickel-cobalt-manganese-based compound particles as defined in claim 1 with a lithium compound; and subjecting the resulting mixture to heat treatment at a temperature of 800 to 1100° C.

8. A non-aqueous electrolyte secondary battery using the lithium composite oxide particles as defined in claim 5 as a positive electrode active substance.

* * * * *